US011315183B2

(12) United States Patent
Amicangioli et al.

(10) Patent No.: US 11,315,183 B2
(45) Date of Patent: Apr. 26, 2022

(54) ELECTRONIC TRADING SYSTEM AND METHOD BASED ON POINT-TO-POINT MESH ARCHITECTURE

(71) Applicant: Hyannis Port Research, Inc., Needham, MA (US)

(72) Inventors: Anthony D. Amicangioli, Newton, MA (US); Allen Bast, Sharon, MA (US); B. Joshua Rosen, Westford, MA (US); Christophe Juhasz, Carlisle, MA (US)

(73) Assignee: Hyannis Port Research, Inc., Needham, MA (US)

( * ) Notice: Subject to any disclaimer, the term of this patent is extended or adjusted under 35 U.S.C. 154(b) by 0 days.

(21) Appl. No.: 16/988,510

(22) Filed: Aug. 7, 2020

(65) Prior Publication Data

US 2022/0044319 A1 Feb. 10, 2022

(51) Int. Cl.
G06Q 40/04 (2012.01)
G06Q 20/02 (2012.01)

(52) U.S. Cl.
CPC ........... *G06Q 40/04* (2013.01); *G06Q 20/027* (2013.01)

(58) Field of Classification Search
None
See application file for complete search history.

(56) References Cited

U.S. PATENT DOCUMENTS 6,697,331 B1 2/2004 Riihinen et al.
6,996,062 B1 2/2006 Freed et al.
(Continued)

FOREIGN PATENT DOCUMENTS

EP 1968275 A1 9/2008
EP 3438830 A1 2/2019
(Continued)

OTHER PUBLICATIONS

"Determinism is the new latency," Arista.com, Solution Brief (Jan. 23, 2019).
(Continued)

*Primary Examiner* — Jason Borlinghaus
(74) *Attorney, Agent, or Firm* — Hamilton, Brook, Smith & Reynolds, P.C.

(57) ABSTRACT

An electronic trading system and corresponding method are based on a point-to-point mesh architecture. The electronic trading system comprises a gateway, core compute node, and sequencer. The core compute node performs an electronic trading matching function. The gateway transmits a message to the core compute node via a first direct connection. The gateway transmits the message via a second direct connection to the sequencer which, in turn, transmits a sequence-marked message to the core compute node via a third direct connection. The core compute node determines relative ordering of the message among other messages in the electronic trading system based on the sequence-marked message to complete the electronic trading matching function, deterministically. The gateway, core compute node, sequencer, and respective direct connections form at least a portion of the point-to-point mesh architecture and enable the electronic trading system to perform high-speed, deterministic, electronic trading of financial instruments while exhibiting low latency, fairness, and fault tolerance, among other features.

31 Claims, 10 Drawing Sheets

(56) References Cited

U.S. PATENT DOCUMENTS

| | | |
|---|---|---|
| 7,023,833 B1 | 4/2006 | Aiello et al. |
| 7,496,086 B2 | 2/2009 | Eckberg et al. |
| 7,720,043 B2 | 5/2010 | Meylan et al. |
| 7,876,740 B2 | 1/2011 | Eastwood et al. |
| 7,876,751 B2 | 1/2011 | Benner et al. |
| 7,885,296 B2 | 2/2011 | Biederman et al. |
| 7,948,883 B1 | 5/2011 | Croft et al. |
| 8,923,341 B2 | 12/2014 | Barnette et al. |
| 9,691,102 B2 | 6/2017 | Studnitzer et al. |
| 9,712,606 B2 | 7/2017 | Fairnlöf et al. |
| 9,929,743 B1 | 3/2018 | Acuna-Rohter et al. |
| 10,104,148 B2 | 10/2018 | Yang et al. |
| 10,262,365 B2 | 4/2019 | Venkataraman |
| 10,417,709 B2 | 9/2019 | Hosman et al. |
| 10,467,693 B2 | 11/2019 | Studnitzer et al. |
| 10,504,183 B2 | 12/2019 | Venkataraman |
| 10,585,729 B2 | 3/2020 | Vaccaro et al. |
| 10,637,967 B2 | 4/2020 | Bonig et al. |
| 10,699,336 B2 * | 6/2020 | Burkhardt .............. G06Q 40/06 |
| 11,088,959 B1 | 8/2021 | Amicangioli et al. |
| 11,228,529 B1 | 1/2022 | Amicangioli et al. |
| 2003/0065974 A1 | 4/2003 | Lam |
| 2003/0235209 A1 | 12/2003 | Garg et al. |
| 2004/0215753 A1 | 10/2004 | Chan et al. |
| 2004/0246897 A1 | 12/2004 | Ma et al. |
| 2007/0255855 A1 | 11/2007 | Knapp et al. |
| 2008/0069118 A1 * | 3/2008 | Monier ............... H04W 40/248 370/400 |
| 2008/0084833 A1 * | 4/2008 | Picard ................. H01L 45/1273 370/280 |
| 2010/0046368 A1 | 2/2010 | Kaempfer et al. |
| 2010/0318673 A1 | 12/2010 | Kemp et al. |
| 2011/0194409 A1 | 8/2011 | Ofelt et al. |
| 2011/0264577 A1 | 10/2011 | Winbom et al. |
| 2012/0044940 A1 | 2/2012 | Katz et al. |
| 2012/0093022 A1 | 4/2012 | Wang |
| 2012/0131221 A1 | 5/2012 | Foygel et al. |
| 2012/0195203 A1 | 8/2012 | Godbole et al. |
| 2012/0317011 A1 | 12/2012 | Duquette |
| 2015/0078376 A1 | 3/2015 | Wisehart |
| 2015/0081508 A1 | 3/2015 | Schwall et al. |
| 2015/0195202 A1 | 7/2015 | Ogura |
| 2015/0341422 A1 | 11/2015 | Farnlof et al. |
| 2015/0356679 A1 | 12/2015 | Schmitt |
| 2016/0028637 A1 | 1/2016 | Vasseur et al. |
| 2016/0063628 A1 | 3/2016 | Kreider et al. |
| 2016/0119080 A1 | 4/2016 | Gineste |
| 2016/0294921 A1 | 10/2016 | Meng et al. |
| 2017/0127341 A1 | 5/2017 | Di Marco |
| 2017/0236203 A1 | 8/2017 | Amicangioli |
| 2018/0047099 A1 | 2/2018 | Bonig et al. |
| 2018/0167492 A1 | 6/2018 | Bonig et al. |
| 2018/0279934 A1 | 10/2018 | Wo |
| 2018/0317121 A1 | 11/2018 | Liao et al. |
| 2018/0359195 A1 | 12/2018 | Shah et al. |
| 2019/0097745 A1 | 3/2019 | Mallela et al. |
| 2019/0222442 A1 | 7/2019 | Wei |
| 2019/0259099 A1 | 8/2019 | Katsuyama et al. |
| 2019/0349309 A1 | 11/2019 | Bonig |
| 2019/0379768 A1 | 12/2019 | Amicangioli et al. |
| 2020/0034929 A1 * | 1/2020 | Rao ......................... G06F 9/546 |
| 2020/0104269 A1 | 4/2020 | Pope et al. |
| 2020/0134720 A1 | 4/2020 | Katsuyama et al. |
| 2020/0167865 A1 | 5/2020 | Craig et al. |
| 2020/0169355 A1 * | 5/2020 | McIlroy ................ H04L 1/1621 |
| 2020/0187274 A1 | 6/2020 | Rune et al. |
| 2022/0044318 A1 | 2/2022 | Amicangioli et al. |
| 2022/0045878 A1 | 2/2022 | Amicangioli et al. |
| 2022/0045955 A1 | 2/2022 | Amicangioli et al. |
| 2022/0045964 A1 | 2/2022 | Amicangioli et al. |

FOREIGN PATENT DOCUMENTS

| | | |
|---|---|---|
| JP | 2019050013 A | 3/2019 |
| WO | 2012144999 A2 | 10/2012 |
| WO | 2018106350 A1 | 6/2018 |
| WO | 2018/183542 A1 | 10/2018 |
| WO | 2022/031878 A1 | 2/2022 |
| WO | 2022/031880 A1 | 2/2022 |
| WO | 2022/031970 A1 | 2/2022 |
| WO | 2022/031971 A1 | 2/2022 |
| WO | 2022/031975 A1 | 2/2022 |

OTHER PUBLICATIONS

"ICON® Deterministic Packet Transport," SEL Schweitzer Engineering Laboratories (2016).

https://tools.ietf.org/html/draft-geng-detnet-requirements-bounded-latency-03; "Requirements of Layer 3 Deterministic Latency Service draft-geng-detnet-requirements-bounded-latency-03," (Mar. 4, 2020).

"Configuring Queuing and Flow Control," Cisco Nexus 5000 Series NX-OS Quality of Service Configuration Guide, Release 5.2(1)N1(1) (Jan. 26, 2018).

Qiu et al., "Hierarchy Virtual Queue Based Flow Control in LTE/SAE," 2010 Second International Conference on Future Networks, pp. 78-82 (2010).

International Search Report and Written Opinion received for PCT Application No. PCT/US2021/044754, dated Dec. 23, 2021, 13 pages.

Zou, J., et al., "Design and Analysis of A Distributed Multi-leg Stock Trading System," 31st International Conference on Distributed Computing Systems, IEEE Computer Society, Jun. 20-24, 2011, pp. 13-24.

* cited by examiner

ELECTRONIC TRADING SYSTEM AND METHOD BASED ON POINT-TO-POINT MESH ARCHITECTURE

BACKGROUND

Current financial instrument trading systems allow traders to submit orders and receive confirmations, market data, and other information, electronically, via a communications network. Such "electronic" marketplaces, implemented by, and also referred to as, "electronic trading systems," are the predominant means of trading most financial instruments, having largely replaced pit-based "open outcry" trading systems whereby the traders, or their representatives, all physically stood in a designated location, i.e., a trading pit, and traded with each other via oral and visual/hand based communication.

When trading shares and/or other financial instruments in an electronic trading system, the electronic trading system is generally configured to match trade orders, i.e., bid orders and compatible ask orders, to create a trade. Depending on the conditions associated with the trade, the processes of matching bid and ask orders can sometimes be complex.

An example of an electronic trading system is a computerized exchange that comprises a central matching engine, typically residing within a central server, and a plurality of distributed servers, or gateways. In such a computerized exchange, the typical process can be as follows: order entry messages, e.g., bid orders and/or ask orders are sent from client or participant devices, e.g., trader terminals, to the computerized exchange and the computerized exchange processes the order entry messages. Such order entry messages are received via the gateways at the central server. The processing in the computerized exchange, e.g., at the central server, may include, among other things, performing order matching based on the received order entry messages.

An order processing acknowledgement message generated by the central server, is then typically returned to the participant devices via the gateway that forwarded the transaction. The gateway may perform additional processing before the order processing acknowledgement message is returned to the participant device. The central server may also disseminate information relating to the order processing acknowledgement message, either in the same form as received or otherwise, to one or more other gateways which perform processing of the order processing acknowledgement message to generate market data output over a market data stream. The market data output is typically forwarded to participant devices or other subscribers of the market data stream through a variety of communication mechanisms, requiring additional processing in the gateways.

SUMMARY

According to an example embodiment, an electronic trading system comprises a gateway, a core compute node (also referred to interchangeably herein as a core compute engine or compute engine) configured to perform an electronic trading matching function, and a sequencer. The gateway is configured to transmit a message to the core compute node via a first direct connection. The gateway is further configured to transmit the message via a second direct connection to the sequencer which is configured to, in turn, transmit a sequence-marked message to the core compute node via a third direct connection. The core compute node is configured to determine relative ordering of the message among other messages in the electronic trading system based on the sequence-marked message to complete the electronic trading matching function.

The message and the sequence-marked message may include equivalent user data, the user data associated with an electronic trade.

The sequencer may further transmit the sequence-marked message via the second direct connection to the gateway.

The message may be a gateway message transmitted in response to receipt of an incoming message from a participant device. The sequence-marked message may be a first sequence-marked message. The core compute node may be further configured to transmit a core compute node message, via the first direct connection to the gateway in response to the message, and to transmit the core compute node message via the third direct connection to the sequencer which is further configured to, in turn, transmit a second sequence-marked message via the second direct connection to the gateway. The gateway may be further configured to determine relative ordering of the core compute node message among other messages in the electronic trading system based on the second sequence-marked message and to transmit an outgoing message to the participant device based on the relative ordering determined.

The sequencer may further transmit the second sequence-marked message via the third direct connection to the core compute node.

The gateway may be a given gateway among a plurality of gateways. The core compute node may be a given core compute node among a plurality of core compute nodes. Each gateway of the plurality of gateways may be coupled to each core compute node of the plurality of core compute nodes via respective first direct connections. The sequencer may be coupled to each gateway of the plurality of gateways via respective second direct connections and coupled to each core compute node of the plurality of core compute nodes via respective third direct connections. The plurality of gateways, plurality of core compute nodes, sequencer, and respective direct connections form at least a portion of a point-to-point mesh system.

Within the point-to-point mesh system, each gateway of the plurality of gateways may be configured to transmit a respective compute-node-destined message transmitted therefrom to all compute nodes of the plurality of core compute nodes and to the sequencer. It should be understood that a message that is destined for compute node may be referred to interchangeably herein as a "compute-node-destined" message. Further, a message that is destined for a gateway may be referred to interchangeably herein as a "gateway-destined" message. Each core compute node of the plurality of core compute nodes may be configured to transmit a respective gateway-destined message transmitted therefrom to all gateways of the plurality of gateways and to the sequencer. The sequencer may be further configured to transmit a respective sequence-marked message in response to the respective compute-node-destined message and the respective gateway-destined message received at the sequencer and to transmit the respective sequence-marked message to the plurality of gateways and plurality of core compute nodes.

The sequencer may be a given sequencer of a plurality of sequencers in the point-to-point mesh system. Each gateway of the plurality of gateways may be coupled to each sequencer of the plurality of sequencers via respective second direct connections. Each core compute node of the plurality of core compute nodes may be coupled to each sequencer of the plurality of sequencers via respective third direct connections. The given sequencer may be configured to be in an active state and each other sequencer of the plurality of sequencers may be configured to be in a standby state. Each sequencer of the plurality of sequencers may be coupled to each other sequencer of the plurality of sequencers via a respective fourth direct connection. Each gateway of the plurality of gateways may be further configured to transmit a respective compute-node-destined message transmitted therefrom to the given sequencer of the plurality of sequencers that is in the active state. Each core compute node of the plurality of core compute nodes are further configured to transmit a respective gateway-destined message transmitted therefrom to the given sequencer of the plurality of sequencers that is in the active state.

The given sequencer that is in the active state may be further configured to transmit the sequence-marked message via each respective fourth direct connection to each other sequencer of the plurality of sequencers.

A plurality of functionally equivalent messages may be received from among the plurality of core compute nodes, plurality of sequencers, or combination thereof, at the given gateway and the given gateway may be further configured to take action based on a given functionally equivalent message of the plurality of functionally equivalent messages, the given functionally equivalent message being first to arrive at the given gateway. The given gateway may be further configured to ignore other functionally equivalent messages of the plurality of functionally equivalent messages that arrive after the given functionally equivalent message.

A plurality of functionally equivalent messages may be received from among the plurality of gateways, plurality of sequencers, or combination thereof, at the given compute node. The given compute node may be further configured to take action based on a given functionally equivalent message of the plurality of functionally equivalent messages, the given functionally equivalent message being first to arrive at the given compute node. The given compute node may be further configured to ignore other functionally equivalent messages of the plurality of functionally equivalent messages that arrive after the given functionally equivalent message.

The electronic trading system may further comprise an order book that is accessible by the core compute node. The core compute node may be further configured to match trade orders related to a financial instrument based on the electronic trading matching function performed. The core compute node may be further configured to maintain a residual position of the financial instrument on the order book. The residual position includes the unmatched amount of the financial instrument remaining after the electronic trading matching function performed on the trade order. It should be understood that the residual position can convey more information than quantity. For example, a position can be long and short (side). According to an example embodiment, the residual position conveys both price and quantity.

The electronic trading system may further comprise a clock. The gateway, core compute node, and sequencer may be synchronized based on the clock.

The gateway may be further configured to serve at least one participant device and transmit the message to the sequencer and core compute nodes in response to receipt of an incoming message at the gateway, the incoming message sourced by the at least one participant device.

The sequencer may be further configured to produce the sequence-marked message by marking the message, or representation thereof, with a unique sequence identifier.

The first direct connection, second direct connection, and third direct connection, or a subset thereof, may be protected by at least one respective redundant direct connection.

The gateway may be a given gateway of a plurality of gateways communicatively coupled to each other via a shared gateway network. The core compute node may be a given core compute node of a plurality of core compute nodes communicatively coupled to each other via a shared core compute node network.

The sequencer may be a given sequencer of a plurality of sequencers communicatively coupled to each other via a shared sequencer network or via respective fourth direct connections.

The electronic trading system may further comprise a system state log. The given sequencer may be an active sequencer. The active sequencer is a single sequencer among the plurality of sequencers that is in an active state. The active sequencer may be configured to transmit the system state log via the shared sequencer network from the active sequencer to at least one other sequencer of the plurality of sequencers. The at least one other sequencer is in a standby state.

The electronic trading system may be an active electronic trading system, at least one sequencer of the plurality of sequencers may be communicatively coupled to a disaster recovery site. The disaster recovery site includes a standby electronic trading system.

The gateway, core compute node, sequencer, and the first, second, and third direct connections form a first point-to-point mesh system. The electronic trading system may be a first electronic trading system communicatively coupled to a proxy node. The proxy node may be further communicatively coupled to at least one participant device and a second electronic trading system. The second electronic trading system includes a second point-to-point mesh system. The proxy node is configured to transmit a message to the first and second electronic trading systems in response to receipt of an incoming message from the at least one participant device and may be further configured to send a response to the at least one participant device in response to receipt of a first arriving response received from the first or second electronic trading systems.

According to another example embodiment, a method for performing electronic trading comprises transmitting a message via a first direct connection from a gateway to a core compute node for performing an electronic trading function in an electronic trading system. The method further comprises transmitting the message via a second direct connection from the gateway to a sequencer in the electronic trading system, transmitting a sequence-marked message via a third direct connection from the sequencer to the core compute node, and determining, at the core compute node, relative ordering of the message among other messages in the electronic trading system based on the sequence-marked message to complete the electronic trading matching function.

Alternative method embodiments parallel those described above in connection with the example electronic trading system embodiment.

According to another example embodiment, a sequencer of an electronic trading system comprises a first communications module configured to communicate directly with a gateway via a first direct connection in a point-to-point mesh system of the electronic trading system. The sequencer further comprises a second communications module configured to communicate directly with a core compute node via a second direct connection in the point-to-point mesh system in the electronic trading system. The sequencer further comprises sequencing logic coupled to the first and second communications modules. The processor is configured to produce a sequence-marked message by marking a message, or representation thereof, with a unique sequence identifier, the message received by the first or second communications module via the first or second direct connection, respectively. The sequencer logic is further configured to transmit the sequence-marked message to the gateway and core compute node via the first and second communications modules, respectively.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1A:
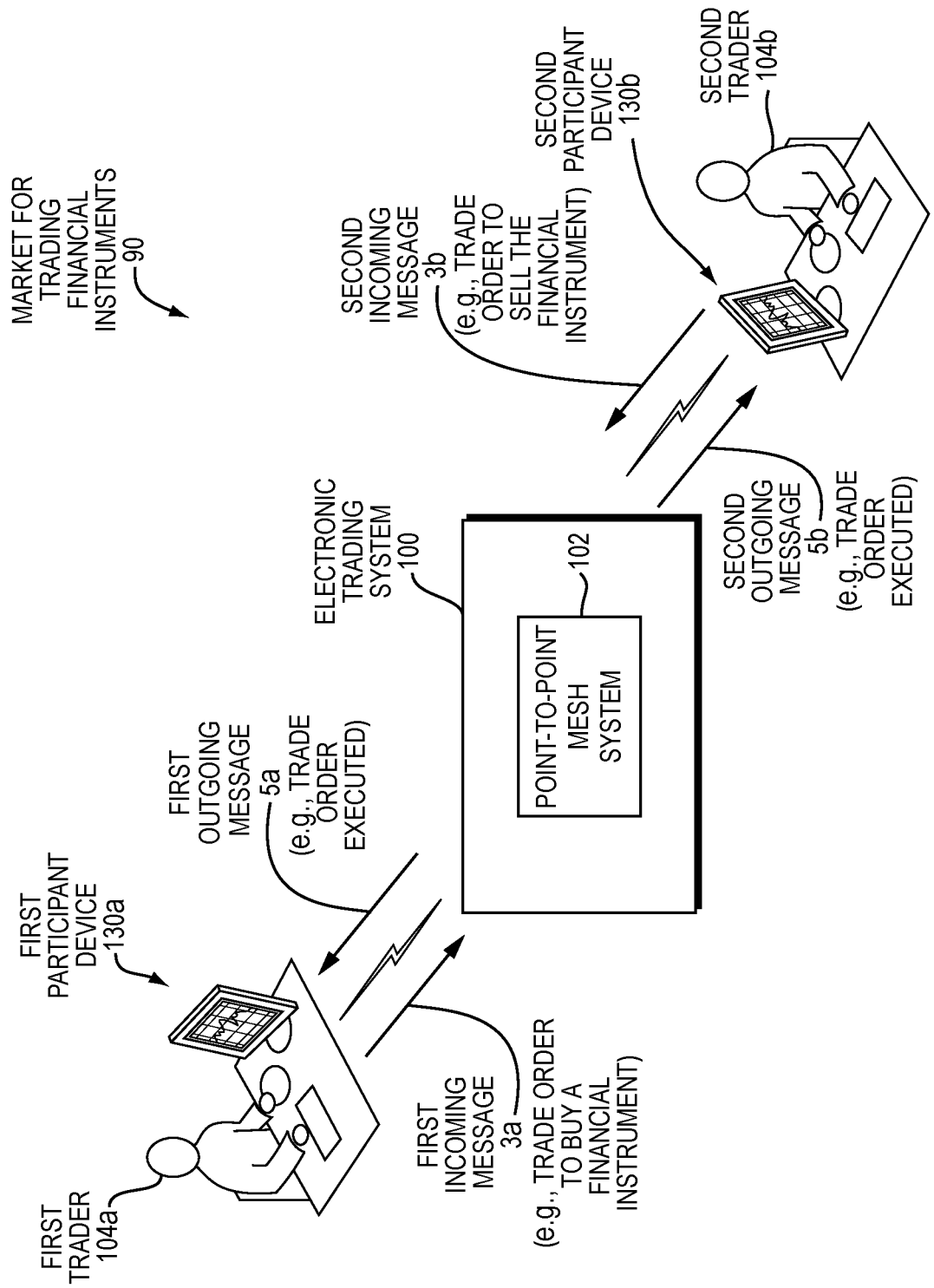
FIG. 1A is a block diagram of an example embodiment of market for trading financial instruments.

A description of example embodiments follows.

It should be understood that a dedicated/direct connection disclosed herein is a point-to-point connection that does not go through a shared network switch.

Current electronic trading systems attempt to offer performance advantages; however, many suffer a performance degradation due to increasing transaction volumes from an increasing number of market participants. Implementation by some market participants is often based on high frequency trading methodologies whereby high-speed computers automatically monitor markets and react, usually in an overwhelming manner, to market events. Further, there is continued demand for ever-decreasing processing latencies and response times, driving a need for additional capacity and performance improvements to maintain performance as experienced by each market participant and to avoid detrimental consequences, such as capacity exhaustion and inequitable access.

The increasing speed at which market participants may evaluate and respond to changes in market data, such as responsive to a market event, is increasing the rate at which transactions are received by electronic trading systems, narrowing the time of receipt gap therebetween and necessitating a need for a higher degree of discrimination so as to resolve the order in which those transactions are received, upon which the deterministic operation of the electronic trading system may be based, e.g., for order allocation, etc. Furthermore, the addition of channels of communication to electronic trading systems, in an effort to increase capacity and opportunity, along with increased bandwidth of each channel, allows for more transactions to be submitted over multiple parallel paths into the electronic trading system.

Accordingly, it is useful for the electronic trading system to discriminate among closely received incoming transactions. It is further useful for such a system to arbitrate among transactions received simultaneously, or temporally so close together as to be considered simultaneously received. In addition to increased capacity and lower latency, the global nature of business has further driven a need for fault tolerance to increase availability and reliability of electronic trading systems.

A business transaction may be defined as one or more operations or acts which are undertaken according to one or more associated business rules (including industry, legal or regulatory requirements or customs) to accomplish a business or commercial purpose, which may include compliance with industry, regulatory or legal requirements. A business transaction may be implemented by one or more computer processing and/or database operations/program actions, which themselves may be referred to as transactions. Business transactions, as defined by the associated business rules, may be characterized as deterministic in that they may be characterized by an interdependency or relationship which affects their result, such as a dependency on the order in which they are processed, such as a temporal order, and/or a dependency on real time processing, as defined by business rules, so as to effect the business/commercial purpose and/or meet participant expectations, referred to herein as "transactional determinism." Generally, a set of deterministic transactions will provide a particular result when executed in one order and a different result when executed in a different order. In some applications, deterministic processing may be preferred/prioritized over real-time processing.

It is useful for high performance electronic trading systems to assure transactional determinism under increasing loads, while providing improved trading opportunities, fault tolerance, low-latency processing, high volume capacity (e.g., process high numbers of messages per second), minimal impact risk mitigation and market protections, as well as equitable access to information and opportunities.

Example embodiments disclosed herein relate to a high-speed electronic trading system that provides a market where orders to buy and sell financial instruments, such as stocks, bonds, commodities, futures, options, and the like, are traded among market participants, such as traders and brokers. An example embodiment of an electronic trading system disclosed herein exhibits low latency, fairness, fault tolerance, and other features more fully described below.

FIG. 1A is a block diagram of an example embodiment of a market 90 that includes an example embodiment of an electronic trading system 100 used for trading financial instruments (not shown). The electronic trading system 100 is primarily responsible for "matching" orders to one another and employs a point-to-point mesh system 102 for matching same. In one example, an offer to "buy" a financial instrument is matched by a matching engine of the point-to-point mesh system 102 to a corresponding counteroffer to "sell." The matched offer and counteroffer must at least partially satisfy the desired price, with any residual unsatisfied quantity passed to another suitable counterorder. Matched orders are then paired and the trade is executed.

Any wholly unsatisfied or partially satisfied orders are maintained in a data structure referred to as an "order book" (not shown). The retained information regarding unmatched orders can be used by the matching engine to satisfy subsequent orders. An order book is typically maintained for each financial instrument and generally defines or otherwise represents the state of the market 90 for that particular product, that is, for that particular financial instrument. The order book may include, for example, the recent prices and quantities at which market participants have expressed a willingness to buy or sell.

The results of matching may also be made visible to market participants via streaming data services (not shown) referred to as market data feeds (not shown). A market data feed typically includes individual messages that carry the pricing for each traded financial instrument, and related information, such as volume and other statistics.

In the market 90, the market participants include two traders, namely a first trader 104a and second trader 104b. It should be understood that the market 90 is not limited to market participants that are traders and the market 90 is not limited to two traders. In the market 90, market participants, such as the first trader 104a and second trader 104b, may submit orders and receive confirmations, market data, and other information, electronically, via a communications network (not shown).

In the example embodiment of FIG. 1A, the first trader 104a has submitted a first trade order (not shown) to buy a financial instrument (not shown) via the first incoming message 3a that is transmitted to the electronic trading system 100 via a first participant device 130a. The electronic trading system 100 has employed the point-to-point mesh system 102 to match the first trade order with a second trade order (not shown) to sell the financial instrument. The second trade order to sell the financial instrument is submitted by the second trader 104b via the second incoming message 3b that is transmitted to the electronic trading system 100 via the second participant device 130b.

In the example embodiment, the electronic trading system 100 transmits a first outgoing message 5a and second outgoing message 5b to the first participant device 130a and second participant device 130b, respectively, to notify the first trader 104a and second trader 104b, respectively, that such respective trade orders have been executed successfully. The point-to-point mesh system 102 enables the electronic trading system 100 to perform high-speed, deterministic, electronic trading of financial instruments. An example embodiment of the point-to-point mesh system 102 is disclosed below with reference to FIG. 1B.

Figure 1B:
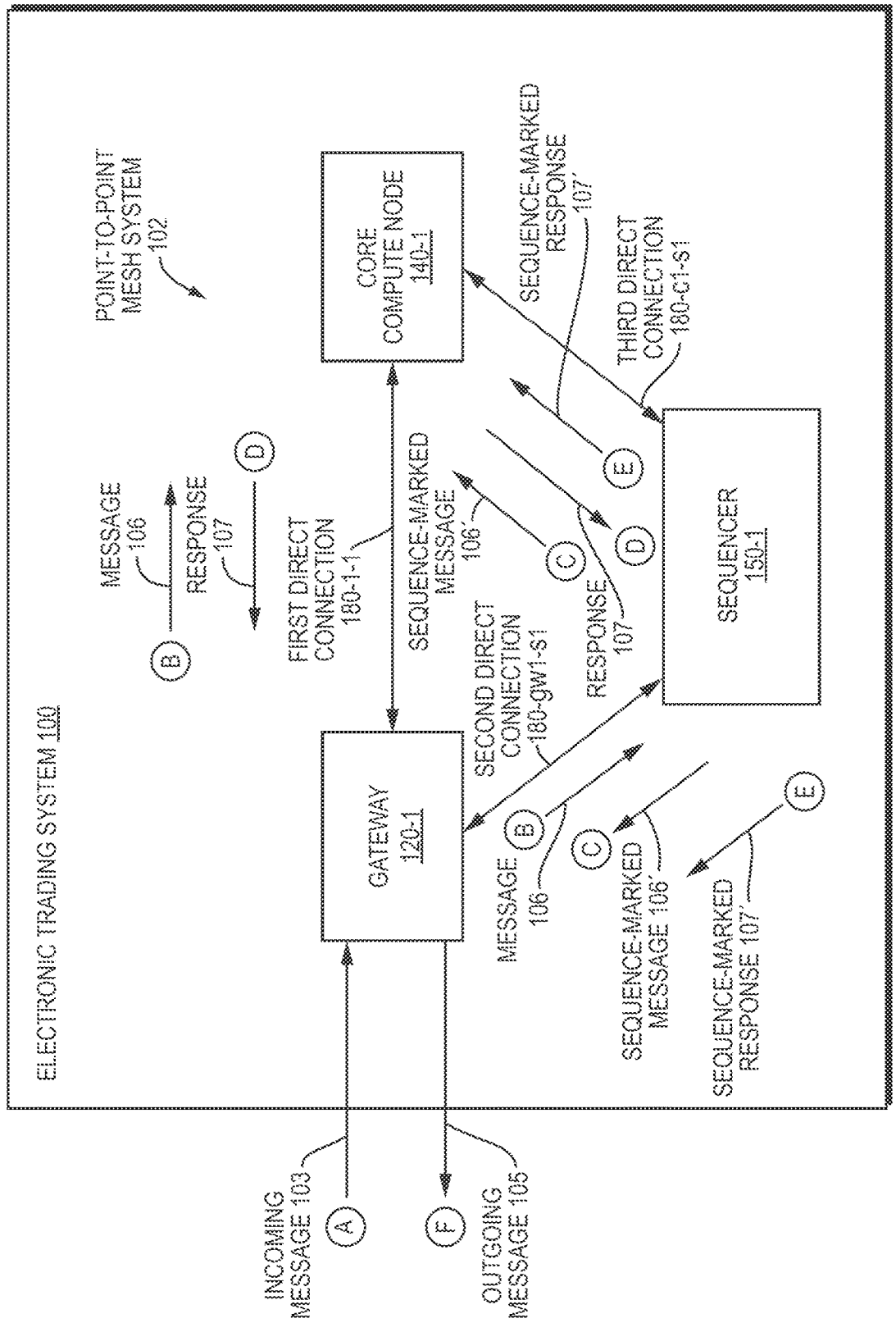
FIG. 1B is a block diagram of an example embodiment of an electronic trading system.

FIG. 1B is a block diagram of an example embodiment of the electronic trading system 100 of FIG. 1A, disclosed above. The electronic trading system 100 comprises a gateway 120-1, a core compute node 140-1 configured to perform an electronic trading matching function, and a sequencer 150-1. The gateway 120-1 is configured to transmit a message 106 (i.e., B) to the core compute node 140-1 via a first direct connection 180-1-1. The gateway 120-1 is further configured to transmit the message 106 (i.e., B) via a second direct connection 180-gw1-s1 to the sequencer 150-1 which is configured to, in turn, transmit a sequence-marked message 106' (i.e., C) to the core compute node 140-1 via a third direct connection 180-c1-s1, such as disclosed further below with regard to FIG. 1D. The core compute node 140-1 is configured to determine relative ordering of the message 106 among other messages (not shown) in the electronic trading system 100 based on the sequence-marked message 106' to complete the electronic trading matching function.

It should be understood that the electronic trading matching function may include more than matching trade orders, per se. For example, the electronic trading matching function may include transmission of an acknowledge message, such as disclosed further below with regard to FIG. 1D. Further, the core compute node 140-1 may perform a portion of the electronic trading matching function prior to receipt of the sequence-marked message 106' that enables the core compute node 140-1 to then complete same.

The sequencer 150-1 may be further configured to produce the sequence-marked message 106' by marking the message 106, or representation thereof, with a unique sequence identifier (not shown). According to an example embodiment, the sequencer 150-1 may further transmit the sequence-marked message 106' (i.e., C) via the second direct connection 180-gw1-s1 to the gateway 120-1. Providing the sequence-marked message 106' (i.e., C) to the sender of the message 106 enables the sender, that is, the gateway 120-1, to correlate the sequence number assigned to the message, that is, the message 106, to other identifying information so that the sender can easily deal with subsequent messages that reference that sequence number, as disclosed further below with regard to FIG. 1D.

The gateway 120-1, core compute node 140-1, sequencer 150-1, first direct connection 180-1-1, second direct connection 180-gw1-s1, and third direct connection 180-c1-s1 form the point-to-point mesh system 102. According to an example embodiment, in the point-to-point mesh system 102, the first direct connection 180-1-1, second direct connection 180-gw1-s1, and third direct connection 180-c1-s1, or a subset thereof, may be protected by at least one respective redundant direct connection (not shown). In an event such direct connection fails, a respective redundant direct connection may be employed instead.

According to an example embodiment, the electronic trading system 100 may further comprise a clock and the gateway 120-1, core compute node 140-1, and sequencer 150-1, may be synchronized based on the clock, such as the clock 195 of FIG. 1D, disclosed further below.

The message 106 may be referred to as a "gateway" message because it comes from a gateway, namely the gateway 120-1. The message 106 may also be referred to as a "compute-node-destined" message as it is destined for a compute node, namely, the core compute node 140-1 in the example embodiment. The message 106 is transmitted in response to receipt of an incoming message 103 (i.e., A) from a participant device (not shown). The sequence-marked message 106' may be a first sequence-marked message. The core compute node 140-1 may be further configured to transmit a core compute node message, that is, the response 107 (i.e., D), via the first direct connection 180-1-1 to the gateway 120-1 in response to the message 106, and to transmit the core compute node message (i.e., response 107) via the third direct connection 180-c1-s1 to the sequencer 150-1 which is further configured to, in turn, transmit a second sequence-marked message, that is, the sequence-marked response 107' (i.e., E), via the second direct connection 180-gw1-s1 to the gateway 120-1. The gateway 120-1 may be further configured to determine relative ordering of the core compute node message (i.e., response 107)

among other messages (not shown) in the electronic trading system 100 based on the second sequence-marked message (i.e., sequence-marked response 107') and to transmit an outgoing message 105 (i.e., F) to the participant device based on the relative ordering determined. It should be understood that the message 106 and response 107 relate to trading activity.

The sequencer 150-1 may further transmit the second sequence-marked message, that is, the sequence-marked response 107' (i.e., E), via the third direct connection 180-$c1$-$s1$ to the core compute node 140-1. Providing the sequence-marked response 107' (i.e., E) to the sender of the response 107 enables the sender, that is, the core compute node 140-1, to correlate the sequence number assigned to the message, that is, the response 107, to other identifying information, so that the sender can easily deal with subsequent messages that reference that sequence number, as disclosed further below with regard to FIG. 1D.

The electronic trading system 100 may further comprise an order book (not shown) accessible by the core compute node 140-1. The core compute node 140-1 may be further configured to match trade orders related to a financial instrument (not shown) based on the electronic trading matching function performed. The core compute node 140-1 may be further configured to maintain a residual position (not shown) of the financial instrument on the order book. The residual position includes an unmatched amount of the financial instrument resulting from the electronic trading matching function performed. It should be understood that the residual position can convey more information than quantity. For example, position can be long and short (side). According to an example embodiment, the residual position conveys both price and quantity.

The gateway 120-1 may be further configured to serve at least one participant device (not shown) and transmit the message 106 to the sequencer 150-1 and core compute node 140-1 in response to receipt of the incoming message 103 at the gateway 120-1. The incoming message 103 is sourced by the at least one participant device.

According to an example embodiment, the gateway 120-1 may be a given gateway among a plurality of gateways, such as the plurality of gateways of FIGS. 1C, 1D, 3, and 4, disclosed further below. Further, the core compute node 140-1 may be a given core compute node among a plurality of core compute nodes, such as the plurality of core compute nodes of FIGS. 1C, 1D, 3, and 4, disclosed further below.

Figure 1C:
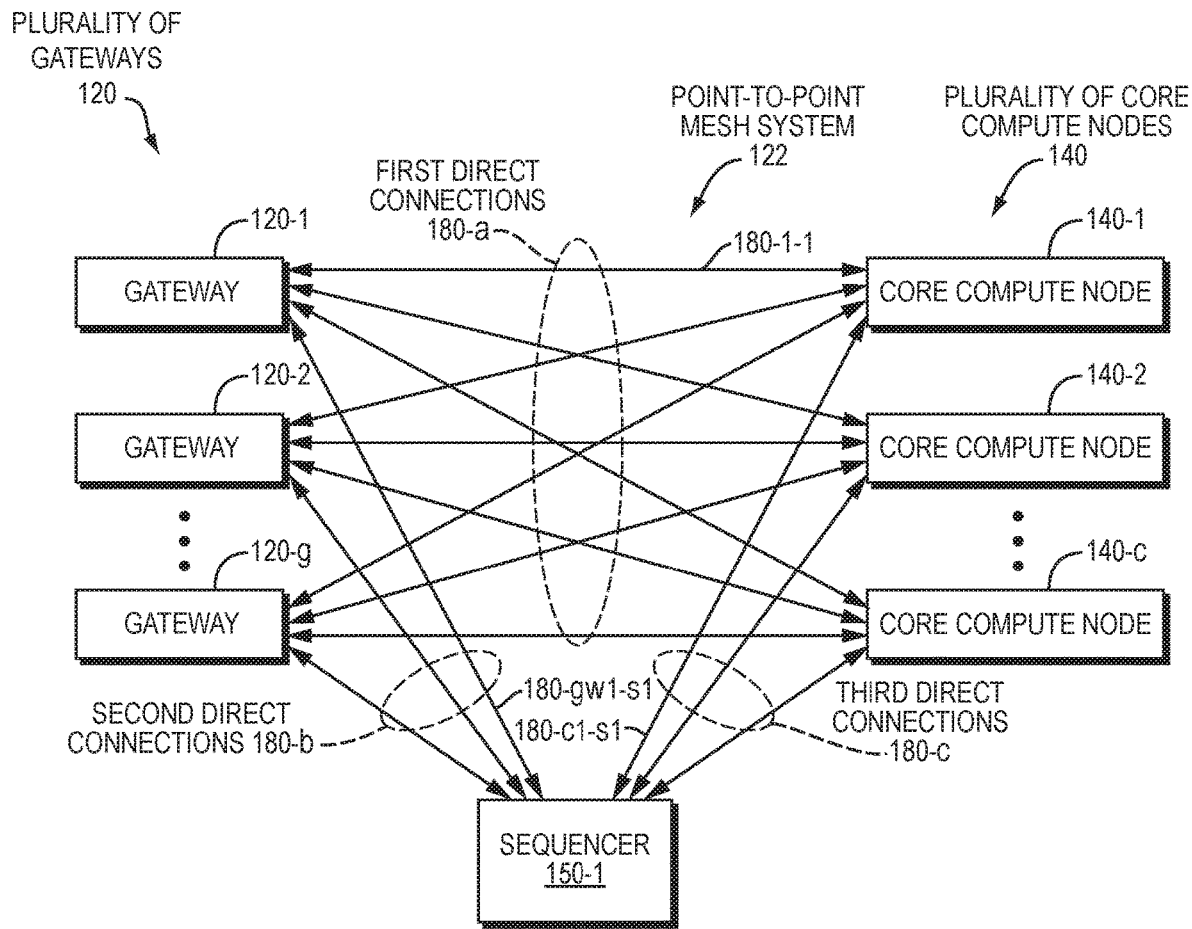
FIG. 1C is a block diagram of an example embodiment of a point-to-point mesh system.

FIG. 1C is a block diagram of an example embodiment of a point-to-point mesh system 122. The point-to-point mesh system 122 includes a plurality of gateways 120, plurality of core compute nodes 140, and the sequencer 150-1. Each gateway 120-1, 120-2 . . . 120-$g$ of the plurality of gateways 120 is coupled to each core compute node 140-1, 140-2 . . . 140-$c$ of the plurality of core compute nodes 140 via respective first direct connections, namely the first direct connections 180-$a$. The sequencer 150-1 is coupled to each gateway of the plurality of gateways via respective second direct connections, namely the second direct connections 180-$b$, and coupled to each core compute node of the plurality of core compute nodes via respective third direct connections, namely the third direct connections 180-$c$. The plurality of gateways, plurality of core compute nodes, sequencer 150-1, and respective direct connections form at least a portion of a point-to-point mesh system 122.

Within the point-to-point mesh system 122, each gateway of the plurality of gateways 120 is configured to transmit a respective compute-node-destined message transmitted therefrom to all compute nodes of the plurality of core compute nodes 140 and to the sequencer 150-1. Within the point-to-point mesh system 122, each core compute node of the plurality of core compute nodes 140 is configured to transmit a respective gateway-destined message transmitted therefrom to all gateways of the plurality of gateways 120 and to the sequencer 150-1. Within the point-to-point mesh system 122, the sequencer 150-1 is further configured to transmit, to the plurality of gateways 120 and plurality of core compute nodes 140, a respective sequence-marked message in response to receipt of the respective compute-node-destined message or the respective gateway-destined message.

A plurality of functionally equivalent messages (not shown) may be received from among the plurality of core compute nodes 140, plurality of sequencers 150, or a combination thereof, at the given gateway and the given gateway may be further configured to take action based on a given functionally equivalent message of the plurality of functionally equivalent messages, the given functionally equivalent message being first to arrive at the given gateway. The given gateway may be further configured to ignore other functionally equivalent messages of the plurality of functionally equivalent messages that arrive after the given functionally equivalent message. Such messages may be understood to be "functionally" equivalent because as multiple core compute nodes each independently generate a response message for the same message received at the multiple core compute nodes, each of the respective responses functionally leads to the same result without being strictly identical. For example, such response messages may at least have different originating core identifiers included therein to uniquely identify the particular core compute node that is sending the response. Such functionally equivalent messages are disclosed further below with regard to FIG. 1D.

According to an example embodiment, at least two such "functionally equivalent messages" may arrive at a given core compute node, such as the core compute node 140-1, from a gateway(s)/sequencer(s), and the given core compute node may be configured such that it only processes the message that arrives first among such functionally equivalent messages. As such, a plurality of functionally equivalent messages may be received from among the plurality of gateways, plurality of sequencers, or combination thereof, at the given compute node. The given compute node may be further configured to take action based on a given functionally equivalent message of the plurality of functionally equivalent messages, the given functionally equivalent message being first to arrive at the given compute node. The given compute node may be further configured to ignore other functionally equivalent messages of the plurality of functionally equivalent messages that arrive after the given functionally equivalent message.

The electronic trading system 100 may be an active electronic trading system, at least one sequencer of the plurality of sequencers may be communicatively coupled to a disaster recovery site that includes a standby electronic trading system, such as the disaster recovery site 155 of FIG. 1D, disclosed below.

Figure 1D:
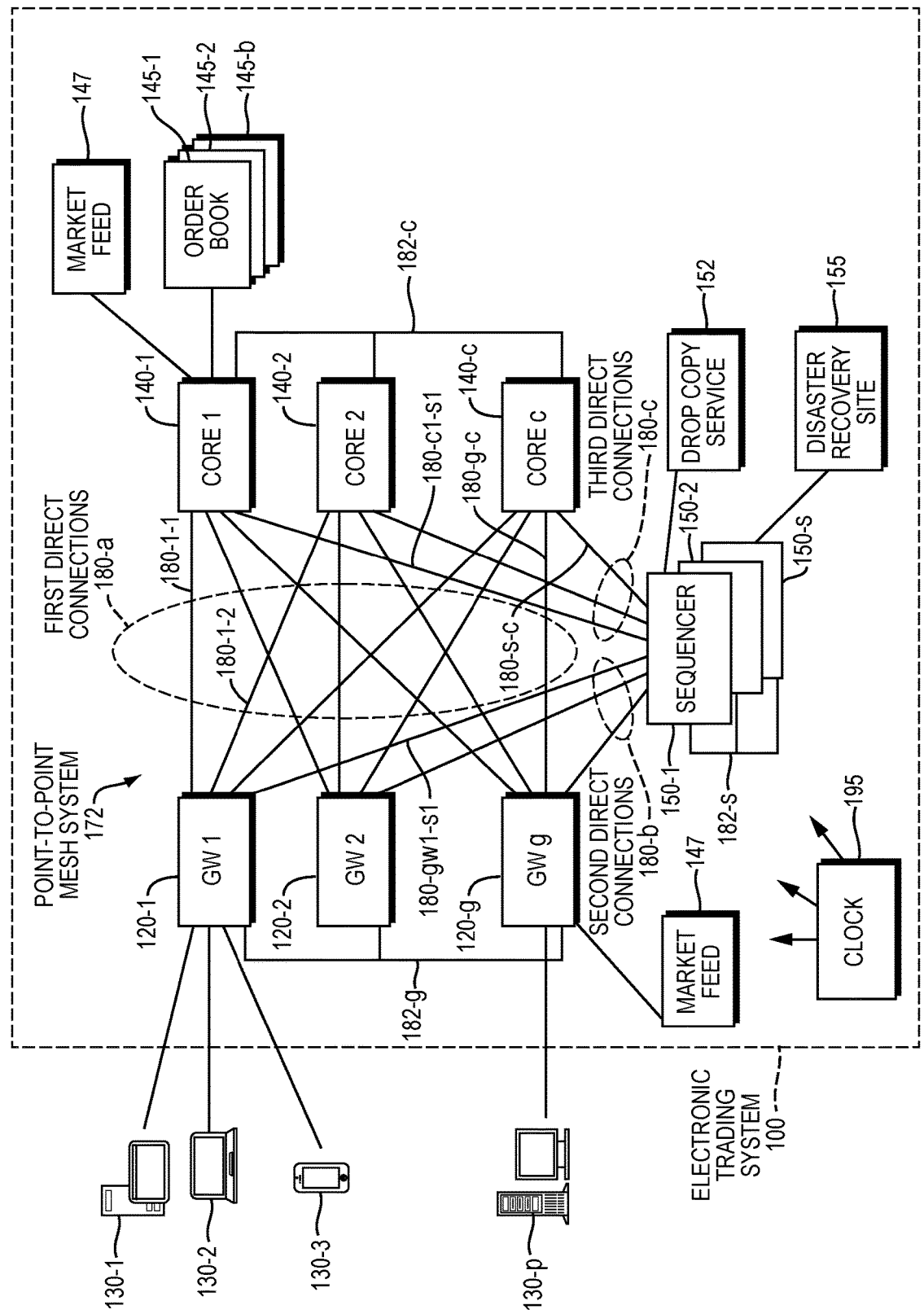
FIG. 1D is a block diagram of another example embodiment of an electronic trading system.

FIG. 1D is a block diagram of another example embodiment of an electronic trading system. FIG. 1D illustrates an example electronic trading system 100 that includes a number of gateways 120-1, 120-2, . . . , 120-$g$ (collectively referred to as the gateways 120), a set of core compute nodes 140-1, 140-2, . . . , 140-$c$ (collectively, the core compute nodes 140 or compute nodes 140), and one or more sequencers 150-1, 150-2, . . . , 150-$s$ (collectively, the sequencers 150). In some embodiments, the gateways 120, core compute nodes 140, and sequencers 150 are, thus, considered to be nodes in the electronic trading system 100. As will be described in more detail below, in one embodiment, the gateways 120, compute nodes 140 and sequencers 150 are directly connected to one another, preferably via low latency, dedicated connections 180.

The term "peer" in relation to the discussion of the electronic trading system 100 refers to another device that generally serves the same function (e.g., "gateway" vs. "core compute node" vs. "sequencer") in the electronic trading system 100. For example, the gateways 120-2, ..., 120-g are the peers for gateway 120-1, the core compute nodes 140-2, ..., 140-c are the peers for the core compute node 140-1, and the sequencers 150-2, ..., 150-s are the peers for the sequencer 150-1.

The electronic trading system 100 processes orders from and provides related information to one or more participant computing devices 130-1, 130-2, ..., 130-p (collectively, the participant devices 130). The participant devices 130 interact with the electronic trading system 100, and may be one or more personal computers, tablets, smartphones, servers, or other data processing devices configured to display and receive trade order information. The participant devices 130 may be operated by a human via a graphical user interface (GUI), or they may be operated via high-speed automated trading methods running on a physical or virtual data processing platform. Each participant device 130 may exchange messages with (that is, send messages to and receive messages from) the electronic trading system 100 via connections established with a gateway 120. While FIG. 1D illustrates each participant device 130 as being connected to electronic trading system 100 via a single connection to a gateway 120, it should be understood that a participant device 130 may be connected to the electronic trading system 100 over multiple connections to one or more gateway devices 120.

Note that, while each gateway 120-1 may serve a single participant device 130, it typically serves multiple participant devices 130.

The compute nodes 140-1, 140-2, ..., 140-c (also referred to herein as matching engines 140 of compute engines 140) provide the matching functions described above and may also generate outgoing messages to be delivered to one or more participant devices 130. Each compute node 140 is a high-performance data processor and typically maintains one or more data structures to search and maintain one or more order books 145-1, 145-2 ..., 145-b. An order book 145-1 may be maintained, for example, for each instrument for which the core compute node 140-1 is responsible. One or more of the compute nodes 140 and/or one or more of the gateways 120 may also provide market data feeds 147. Market data feeds 147 may be broadcast (for example, multicast), to subscribers, which may be participant devices 130 or any other suitable computing devices.

Some outgoing messages generated by the core compute nodes 140 may be synchronous, that is, generated directly by a core compute node 140 in response to one or more incoming messages received from one or more participant devices 130, such as an outgoing "acknowledgement message" or "execution message" in response to a corresponding incoming "new order" message. In some embodiments, however, at least some outgoing messages may be asynchronous, initiated by the trading system 100, for example, certain "unsolicited" cancel messages and "trade break" or "trade bust" messages.

Distributed computing environments, such as the electronic trading system 100, can be configured with multiple matching engines operating in parallel on multiple compute nodes 140.

The sequencers 150 ensure that the proper sequence of any order-dependent operations is maintained. To ensure that operations on incoming messages are not performed out of order, incoming messages received at one or more gateways 120, for example, a new trade order message from one of participant devices 130, typically must then pass through at least one sequencer 150 in which they are marked with a sequence identifier. That identifier may be a unique, monotonically increasing value which is used in the course of subsequent processing throughout the distributed system 100 (e.g., electronic trading system 100), to determine the relative ordering among messages and to uniquely identify messages throughout electronic trading system 100. It should be understood, however, that, while unique, the identifier is not limited to a monotonically increasing or decreasing value. Once sequenced, the marked incoming messages, that is, the sequence-marked messages, are typically then forwarded by sequencer(s) 150 to other downstream compute nodes 140 to perform potentially order-dependent processing on the messages.

In some embodiments, messages may also flow in the other direction, that is, from a core compute node 140 to one or more of the participant devices 130, passing through one or more of the gateways 120. Such outgoing messages generated by a core compute node 140 may also be order-dependent, and accordingly may also typically first pass through a sequencer 150 to be marked with a sequence identifier. The sequencer 150 may then forward the marked response message to the gateways 120 in order to pass on to participant devices 130 in a properly deterministic order.

The use of a sequencer 150 to generate unique sequence numbers and mark messages or representations thereof with same, that is, to generate sequence-marked messages, ensures the correct ordering of operations is maintained throughout the distributed system, that is, the electronic trading system 100, regardless of which compute node or set of compute nodes 140 processes the messages. This approach provides "state determinism," for example, an overall state of the system is deterministic and reproduceable (possibly somewhere else, such as at a disaster recovery site), to provide fault-tolerance, high availability and disaster recoverability.

It may also be important for a generating node (i.e., a node introducing a new message into the electronic trading system 100, for example by generating a new message and/or by forwarding a message received from a participant device 130) and its peer nodes to receive the sequence number assigned to that message. Receiving the sequence number for a message it generated may be useful to the generating node and its peer nodes not only for processing messages in order according to their sequence numbers, but also to correlate the message generated by the node with the message's identifier that is used throughout the rest of the electronic trading system 100. A subsequent message generated within the electronic trading system 100, while also being assigned its own sequence number, may yet reference one or more sequence numbers of related preceding messages. Accordingly, a node may need to quickly reference (by sequence number) a message the node had itself previously generated, because, for example, the sequence number of the message the node had generated was referenced in a subsequent message.

In some embodiments, the generating node may first send a message to the sequencer 150 and wait to receive the sequence number from the sequencer before the generating node forwards the message to other nodes in electronic trading system 100.

In alternate example embodiments, to avoid at least one hop, which could add undesirable increased latency within electronic trading system 100, after receiving the un-sequenced message from the generating node, the sequencer 150 may not only send a sequenced version of the message (i.e., a sequence-marked message) to destination nodes, but may also send substantially simultaneously a sequenced version of the message back to the sending node and its peers. For example, after assigning a sequence number to an incoming message sent from the gateway 120-1 to core compute nodes 140, the sequencer 150 may not only forward the sequenced version of the message to the core compute nodes 140, but may also send a sequenced version of that message back to the gateway 120-1 and the other gateways 120. Accordingly, if any subsequent message generated in a core compute node 140 references that sequence number, any gateway 120 may easily identify the associated message originally generated by gateway 120-1 by its sequence number.

Similarly, in some further embodiments, a sequenced version of an outgoing message generated by and sent from a core compute node 140 to gateways 120, and sequenced by sequencer 150, may be forwarded by sequencer 150 both to gateways 120 and back to core compute nodes 140.

Some embodiments may include multiple sequencers 150 for high availability, for example, to ensure that another sequencer is available if the first sequencer fails, such as disclosed further below with regard to FIG. 4. For embodiments with multiple sequencers 150 (e.g., a currently active sequencer 150-1, and one or more standby sequencers 150-2, ..., 150-s), the currently active sequencer 150-1 may maintain a system state log (not shown) of all the messages that passed through sequencer 150-1, as well as the messages' associated sequence numbers. This system state log may be continuously or periodically transmitted to the standby sequencers to provide them with requisite system state to allow them to take over as an active sequencer, if necessary.

The system state log may also be continually or periodically replicated to one or more sequencers in a standby replica electronic trading system (not shown in detail) at a disaster recovery site 155, thereby allowing electronic trading to continue with the exact same state at the disaster recovery site 155, should the primary site of the electronic trading system 100 suffer catastrophic failure.

In some embodiments, the system state log may also be provided to a drop copy service 152, which may be implemented by one or more of the sequencers, and/or by one or more other nodes in the electronic trading system 100. The drop copy service 152 may provide a record of daily trading activity through the electronic trading system 100 that may be delivered to regulatory authorities and/or clients, who may, for example be connected via participant devices 130. In alternate embodiments, the drop copy service 152 may be implemented on one or more of the gateways 120. Furthermore, in addition to or instead of referencing the system state log, the drop copy service 152 may provide the record of trading activity based on the contents of incoming and outgoing messages sent throughout the electronic trading system 100. For example, in some embodiments, a gateway 120 implementing the drop copy service 152 may receive from the sequencer 150 (and/or from core compute nodes 140 and other gateways 120) all messages exchanged throughout the electronic trading system 100. A participant device 130 configured to receive the record of daily trading activity from the drop copy service 152 may not necessarily also be sending orders to and utilizing a matching function of the electronic trading system 100.

Messages exchanged between participant devices 130 and gateways 120 may be according to any suitable protocol that may be used for financial trading (referred to for convenience as, "financial trading protocol"). For example, the messages may be exchanged according to custom protocols or established standard protocols, including both binary protocols (such as Nasdaq OUCH and NYSE UTP), and text-based protocols (such as NYSE FIX CCG). In some embodiments, the electronic trading system 100 may support exchanging messages simultaneously according to multiple financial trading protocols, including multiple protocols simultaneously on the same gateway 120. For example, the participant devices 130-1, 130-2, and 130-3 may simultaneously have established trading connections and may be exchanging messages with the gateway 120-1 according to Nasdaq Ouch, NYSE UTP, and NYSE FIX CCG, respectively.

Furthermore, in some embodiments, the gateways 120 may translate messages according to a financial trading protocol received from a participant device 130 into a normalized message format used for exchanging messages among nodes within the electronic trading system 100. The normalized trading format may be an existing protocol or may generally be of a different size and data format than that of any financial trading protocol used to exchange messages with participant devices 130. For example, the normalized trading format, when compared to a financial trading protocol of the original incoming message received at the gateway 120 from a participant device 130, may include in some cases one or more additional fields or parameters, may omit one or more fields or parameters, and/or each field or parameter of a message in the normalized format may be of a different data type or size than the corresponding message received at gateway 120 from the participant device 130. Similarly, in the other direction, the gateways 120 may translate outgoing messages generated in the normalized format by the electronic trading system 100 into messages in the format of one or more financial trading protocols used by the participant devices 130 to communicate with the gateways 120.

In the era of high-speed trading, in which microseconds or even nanoseconds are consequential, participant devices 130 exchanging messages with the electronic trading system 100 are often very sensitive to latency, preferring low, predictable latency. The arrangement shown in FIG. 1D accommodates this requirement by providing a point-to-point mesh 172 architecture between at least each of the gateways 120 and each of the compute nodes 140. In some embodiments, each gateway 120 in the mesh 172 may have a dedicated high-speed direct connection 180 to the compute nodes 140 and the sequencers 150.

For example, the dedicated connection 180-1-1 is provided between the gateway 120-1 (i.e., GW 1) and core compute node 140-1 (i.e., Core 1), the dedicated connection 180-1-2 is provided between the gateway 120-1 (i.e., GW 1) and compute node 140-2 (i.e., Core 2), and so on, with example connection 180-g-c provided between gateway 120-g and compute node 140-c, example connection 180-s-c provided between sequencer 150 and core compute node 140-c (i.e., Core c), example connection 180-gw1-s1 provided between the gateway 120-1 (i.e., GW g) and sequencer 150-1, and example connection 180-c1-s1 provided between the core compute node 140-1 (i.e., Core 1) and sequencer 150-1.

It should be understood that each dedicated connection 180 in the point-to-point mesh 172 is, in some embodiments, a point-to-point direct connection that does not utilize a shared switch. A dedicated or direct connection may be referred to interchangeably herein as a direct or dedicated "link" and is a direct connection between two end points that is dedicated (e.g., non-shared) for communication therebetween. Such a dedicated/direct link may be any suitable interconnect(s) or interface(s), such as disclosed further below, and is not limited to a network link, such as wired Ethernet network connection or other type of wired or wireless network link. The dedicated/direct connection/link may be referred to herein as an end-to-end path between the two end points. Such an end-to-end path may be a single connection/link or may include a series of connections/links; however, bandwidth of the dedicated/direct connection/link in its entirety, that is, from one end point to another end point, is non-shared and neither bandwidth nor latency of the dedicated/direct connection/link can be impacted by resource utilization of element(s) if so traversed. For example, the dedicated/direct connection/link may traverse one or more buffer(s) or other elements that are not bandwidth or latency impacting based on utilization thereof. The dedicated/direct connection/link would not, however, traverse a shared network switch as such a switch can impact bandwidth and/or latency due to its shared usage.

For example, in some embodiments, the dedicated connections 180 in the point-to-point mesh 172 may be provided in a number of ways, such as a 10 Gigabit Ethernet (GigE), 25 GigE, 40 GigE, 100 GigE, InfiniBand, Peripheral Component Interconnect-Express (PCIe), RapidIO, Small Computer System Interface (SCSI), FireWire, Universal Serial Bus (USB), High Definition Multimedia Interface (HDMI), or custom serial or parallel busses. Therefore, although the compute engines 140, gateways 120, sequencers 150, and other components may sometimes be referred to herein as "nodes," the use of terms such as "compute node" or "gateway node" or "sequencer node" or "mesh node" should not be interpreted to mean that particular components are necessarily connected using a network link, since other types of interconnects or interfaces are possible. Further, a "node," as disclosed herein, may be any suitable hardware, software, firmware component(s), or combination thereof, configured to perform the respective function(s) set forth for the node. As explained in more detail below, a node may be a programmed general purpose processor, but may also be a dedicated hardware device, such as a field programmable gate array (FPGA), application specific integrated circuit (ASIC), or other hardware device or group of devices, logic within a hardware device, printed circuit board (PCB), or other hardware component.

It should be understood that nodes disclosed herein may be separate elements or may be integrated together within a single element, such as within a single FPGA, ASIC, or other element configured to implement logic to perform the functions of such nodes as set forth herein. Further, a node may be an instantiation of software implementing logic executed by general purpose computer and/or any of the foregoing devices.

Conventional approaches to connecting components, such as the compute engines 140, gateways 120, and sequencers 150 through one or more shared switches, do not provide the lowest possible latency. These conventional approaches also result in unpredictable spikes in latency during periods of heavier message traffic.

In an example embodiment, dedicated connections 180 are also provided directly between each gateway 120 and each sequencer 150, and between each sequencer 150 and each core compute node 140. Furthermore, in some embodiments, dedicated connections 180 are provided among all the sequencers, so that an example sequencer 150-1 has a dedicated connection 180 to each other sequencer 150-2, . . . , 150-s. While not pictured in FIG. 1D, in some embodiments, dedicated connections 180 may also be provided among all the gateways 120, so that each gateway 120-1 has a dedicated connection 180 to each other gateway 120-2, . . . , 120-g, such as disclosed further below with regard to FIG. 3. Similarly, in some embodiments, dedicated connections 180 are also provided among all the compute nodes 140, so that an example core compute node 140-1 has a dedicated connection 180 to each other core compute node 140-2, . . . , 140-c, such as disclosed further below with regard to FIG. 3.

It should also be understood that a dedicated connection 180 between two nodes (e.g., between any two nodes 120, 150, or 140) may in some embodiments be implemented as multiple redundant dedicated connections between those same two nodes, for increased redundancy and reliability. For example, the dedicated connection 180-1-1 between the gateway 120-1 and core compute node 140-1 may actually be implemented as a pair of dedicated connections.

In addition, according to some embodiments, any message sent out by a node is sent out in parallel to all nodes directly connected to it in the point-to-point mesh 172. Each node in the point-to-point mesh 172 may determine for itself, for example, based on the node's configuration, whether to take some action upon receipt of a message, or whether instead simply to ignore the message. In some embodiments, a node may never completely ignore a message; even if the node, due to its configuration, does not take substantial action upon receipt of a message, it may at least take minimal action, such as consuming any sequence number assigned to the message by the sequencer 150. That is, in such embodiments, the node may keep track of a last received sequence number to ensure that when the node takes more substantial action on a message, it does so in proper sequenced order.

For example, a message containing an order to "Sell 10 shares of Microsoft at $190.00" might originate from the participant device 130-1, such as a trader's personal computer, and arrive at gateway 120-1 (i.e., GW 1). That message will be sent to all core compute nodes 140-1, 140-2, . . . , 140-c even though only core compute node 140-2 is currently performing matching for Microsoft orders. All other core compute nodes 140-1, 140-3, . . . , 140-c may upon receipt ignore the message or only take minimal action on the message. For example, the only action taken by 140-1, 140-3, . . . , 140-c may be to consume the sequence number assigned to the message by the sequencer 150-1. That message will also be sent to all of the sequencers 150-1, 150-2, . . . , 150-s even though a single sequencer (in this example, sequencer 150-1) is the currently active sequencer servicing the mesh. The other sequencers 150-2, . . . , 150-s also received the message to allow them the opportunity to take over as the currently active sequencer should sequencer 150-1 (the currently active sequencer) fail, or if the overall reliability of the electronic trading system 100 would increase by moving to a different active sequencer. One or more of the other sequencers (sequencer 150-2 for example) may also be responsible for relaying system state to the disaster recovery site 155. The disaster recovery site 155 may include a replica of the electronic trading system 100 at another physical location, the replica comprising physical or virtual instantiations of some or all of the individual components of the electronic trading system 100.

By sending each message out in parallel to all directly connected nodes, the electronic trading system 100 reduces complexity and also facilitates redundancy and high availability. If all directly connected nodes receive all messages by default, multiple nodes can be configured to take action on the same message in a redundant fashion. Returning to the example above of the order to "Sell 10 shares of Microsoft at $190.00," in some embodiments, multiple core compute nodes 140 may simultaneously perform matching for Microsoft orders. For example, both the core compute node 140-1 and core compute node 140-2 may simultaneously perform matching for Microsoft messages, and may each independently generate, after having received the incoming message of the "Sell" order, a response message such as an acknowledgement or execution message that each of core compute node 140-1 and core compute node 140-2 sends to the gateways 120 through the sequencer(s) 150 to be passed on to one or more participant devices 130.

Because of the strict ordering and state determinism assured by the sequencer(s) 150, it is possible to guarantee that each of the associated response messages independently generated and sent from the core compute nodes 140-1 and 140-2 are substantially and functionally equivalent; accordingly, the architecture of the electronic trading system 100 readily supports redundant processing of messages, which increases the availability and resiliency of the system. In such embodiments, gateways 120 may receive multiple associated outgoing messages from core compute nodes 140 for the same corresponding incoming message. Due to the fact that it can be guaranteed that these multiple associated response messages are equivalent, the gateways 120 may simply process only the first received outgoing message, ignoring subsequent associated outgoing messages corresponding to the same incoming message. In some embodiments, the "first" and "subsequent" messages may be identified by their associated sequence numbers, as such messages are sequence-marked messages. Allowing the gateways 120 to take action on the first of several associated response messages to reach them may, therefore, also improve the overall latency of the electronic trading system 100.

Such a point-to-point mesh 172 architecture of the electronic trading system 100, besides supporting low, predictable latency and redundant processing of messages, also provides for built-in redundant, multiple paths. As can be seen, there exist multiple paths between any gateway 120 and any compute node 140. Even if a direct connection 180-1-1 between between gateway 120-1 and compute node 140-1 becomes unavailable, communication is still possible between those two elements via an alternate path, such as by traversing one of the sequencers 150 instead. Thus, more generally speaking, there exist multiple paths between any node and any other node in the point-to-point mesh 172.

Furthermore, this point-to-point mesh architecture inherently supports another important goal of a financial trading system, namely, fairness. The point-to-point architecture with direct connections between nodes ensures that the path between any gateway 120 and any core compute node 140, or between the sequencer 150 and any other node has identical or, at least very similar latency. Therefore, two incoming messages sent out to the sequencer 150 at the same time from two different gateways 120 should reach the sequencer 150 substantially simultaneously. Similarly, an outgoing message being sent from a core compute node 140 is sent to all gateways 120 simultaneously, and should be received by each gateway at substantially the same time. Because the topology of the point-to-point mesh does not favor any single gateway 120, chances are minimized that being connected to a particular gateway 120 may give a participant device 130 an unfair advantage or disadvantage.

Additionally, the point-to-point mesh architecture of the electronic trading system 100 allows for easily reconfiguring the function of a node, that is, whether a node is currently serving as a gateway 120, core compute node 140 or sequencer 150. It is particularly easy to perform such reconfiguration in embodiments in which each node has a direct connection between itself and each other node in the point-to-point mesh. When each node is connected via a direct connection to each other node in the mesh, no re-wiring or re-cabling of connections 180 (whether physical or virtual) within the point-to-point mesh 172 is required in order to change the function of a node in the mesh (for example, changing the function of a node from a core compute node 140 to a gateway 120, or from a gateway 120 to a sequencer 150). In such embodiments, the reconfiguration required that is internal to the point-to-point mesh 172 may be easily accomplished through configuration changes that are carried out remotely. In the case of a node being reconfigured to serve as a new gateway 120 or being reconfigured from serving as a gateway 120 to another function, there may be some ancillary networking changes required that are external to the point-to-point mesh 172, but the internal wiring of the mesh may remain intact.

Accordingly, in some embodiments, the reconfiguration of the function of a node may be accomplished live, even dynamically, during trading hours. For example, due to changes on characteristics of the load of the electronic trading system 100 or new demand, it may be useful to reconfigure a core compute node 140-1 to instead serve as an additional gateway 120. After some possible redistribution of state or configuration to other compute nodes 140, the new gateway 120 may be available to start accepting new connections from participant devices 130.

In some embodiments, lower-speed, potentially higher latency shared connections 182 may be provided among the system components, including among the gateways 120 and/or the core compute nodes 140. These shared connections 182 may be used for maintenance, control operations, management operations, and/or similar operations that do not require very low latency communications and, in contrast to messages related to trading activity carried over the dedicated connections 180 in the point-to-point mesh 172, such as the message 106 and response 107 disclosed above with regard to FIG. 1B. In contrast to the first direct connections 108-a, second direct connections 180-b, and third direct connections 180-c that carry traffic related to trading activity, the shared connections 182g and 182c carry non-trading activity type traffic. Shared connections 182, carrying non-trading traffic, may be over one or more shared networks and via one or more network switches, and nodes in the mesh may be distributed among these shared networks in different ways. For example, in some embodiments, gateways 120 may all be in a gateway-wide shared network 182-g, compute nodes 140 may be in their own respective compute node-wide shared network 182-c, and sequencers 150 may be in their own distinct sequencer-wide shared network 182-s, while in other embodiments all the nodes in the mesh may communicate over the same shared network for these non-latency sensitive operations.

Distributed computing environments, such as electronic trading system 100, sometimes rely on high resolution clocks to maintain tight synchronization among various components. To that end, one or more of the nodes 120, 140, 150 might be provided with access to a clock, such as a high-resolution global positioning system (GPS) clock 195 in some embodiments. For purposes of the following discussion, gateways 120, compute nodes 140, and sequencers 150 connected in the point-to-point mesh 172 may be referred to as "Mesh Nodes," and may have an architecture, such as disclosed below with regard to FIG. 2.

Figure 2:
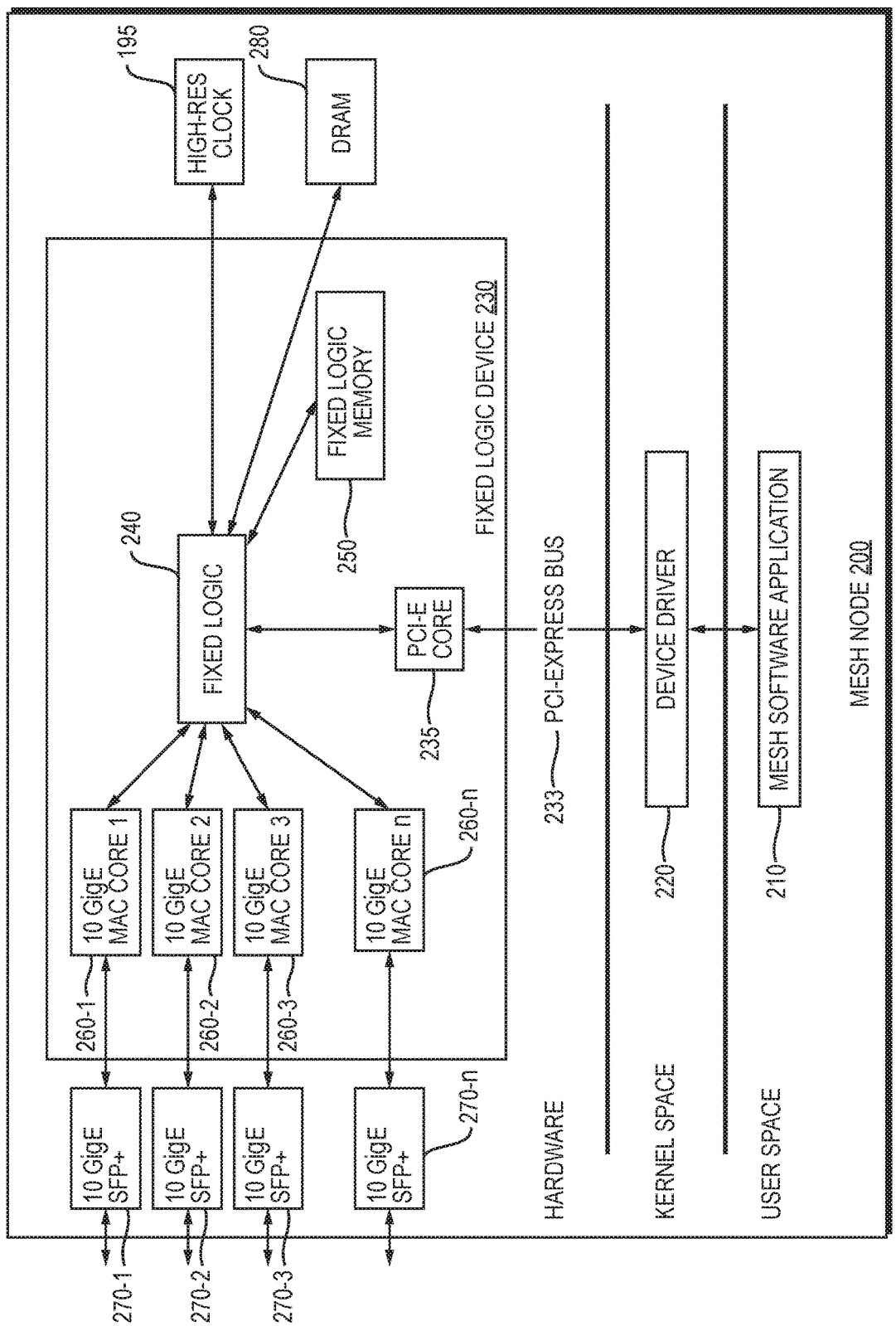
FIG. 2 is a block diagram of an example embodiment of a mesh node in a point-to-point mesh architecture of an electronic trading system.

FIG. 2 is a block diagram of an example embodiment of a Mesh Node in a point-to-point mesh architecture of an electronic trading system, such as the electronic trading system 100, disclosed above. FIG. 2 illustrates an example embodiment of a Mesh Node 200 in the point-to-point mesh 172 architecture of the electronic trading system 100. Mesh node 200 could represent a gateway 120, a sequencer 150, or a core compute node 140, for example. Although in this example, functionality in the Mesh Node 200 is distributed across both hardware and software, Mesh Node 200 may be implemented in any suitable combination of hardware and software, including pure hardware and pure software implementations, and in some embodiments, any or all of gateways 120, compute nodes 140, and/or sequencers 150 may be implemented with commercial off-the-shelf components.

In the embodiment illustrated by FIG. 2, in order to achieve low latency, some functionality is implemented in hardware in Fixed Logic Device 230, while other functionality is implemented in software in Device Driver 220 and Mesh Software Application 210. Fixed Logic Device 230 may be implemented in any suitable way, including an Application-Specific Integrated Circuit (ASIC), an embedded processor, or a Field Programmable Gate Array (FPGA). Mesh Software Application 210 and Device Driver 220 may be implemented as instructions executing on one or more programmable data processors, such as central processing units (CPUs). Different versions or configurations of Mesh Software Application 210 may be installed on Mesh Node 200 depending on its role. For example, based on whether Mesh Node 200 is acting as a gateway 120, sequencer 150, or core compute node 140, a different version or configuration of Mesh Software Application 210 may be installed.

While any suitable physical communications link layer may be employed, (including universal serial bus (USB), peripheral component interconnect (PCI) express (PCI-Express or PCI-E), high-definition multi-media interface (HDMI), 10 Gigabit Ethernet (GigE), 40 GigE, 100 GigE, or InfiniBand (IB), over fiber or copper cables), in this example, the Mesh Node 200 has multiple low latency 10 Gigabit Ethernet small form-factor pluggable plus (SFP+) connectors (interfaces) 270-1, 270-2, 270-3, . . . , 270-$n$, (known collectively as connectors 270). The connectors 270 may be directly connected to other nodes in the point-to-point mesh via dedicated connections 180, connected via shared connections 182, and/or connected to participant devices 130 via a gateway 120, for example. These connectors 270 are electronically coupled in this example to 10 GigE media access (MAC) Cores 260-1, 260-2, 260-3, . . . , 260-$n$, (known collectively as GigE Cores 260), respectively, which in this embodiment are implemented by Fixed Logic Device 230 to ensure minimal latency. In other embodiments, 10 GigE MAC Cores 260 may be implemented by functionality outside Fixed Logic Device 230, for example, in PCI-E network interface card adapters.

In some embodiments, Fixed Logic Device 230 may also include other components. In the example of FIG. 2, Fixed Logic Device 230 also includes a Fixed Logic 240 component. In some embodiments, fixed Logic component 240 may implement different functionality depending on the role of Mesh Node 200, for example, whether it is a gateway 120, sequencer 150, or core compute node 140. Also included in Fixed Logic Device 230 is Fixed Logic Memory 250, which may be a memory that is accessed with minimal latency by Fixed Logic 240. Fixed Logic Device 230 also includes a PCI-E Core 235, which may implement PCI Express functionality. In this example, PCI Express is used as a conduit mechanism to transfer data between hardware and software, or more specifically, between Fixed Logic Device 240 and the Mesh Software Application 210, via Device Driver 220 over PCI Express Bus 233. However, any suitable data transfer mechanism between hardware and software may be employed, including Direct Memory Access (DMA), shared memory buffers, or memory mapping.

In some embodiments, the Mesh Node 200 may also include other hardware components. For example, depending on its role in the electronic trading system 100, the Mesh Node 200 in some embodiments may also include the High-Resolution Clock 195 (also illustrated in and disclosed in conjunction with FIG. 1D) used in the implementation of high-resolution clock synchronization among nodes in electronic trading system 100. A Dynamic Random-Access Memory (DRAM) 280 may also be included in the Mesh Node 200 as an additional memory in conjunction with the Fixed Logic Memory 250. The DRAM 280 may be any suitable volatile or non-volatile memory, including one or more random-access memory banks, hard disk(s), and solid-state disk(s), and accessed over any suitable memory or storage interface. As disclosed above, the Mesh Node 200 could represent a gateway 120, a sequencer 150, or a core compute node 140 and may be arranged in a point-to-point mesh architecture, such as disclosed above with regard to FIGS. 1A-D, above, and as disclosed with regarding to FIG. 3, below.

Figure 3:
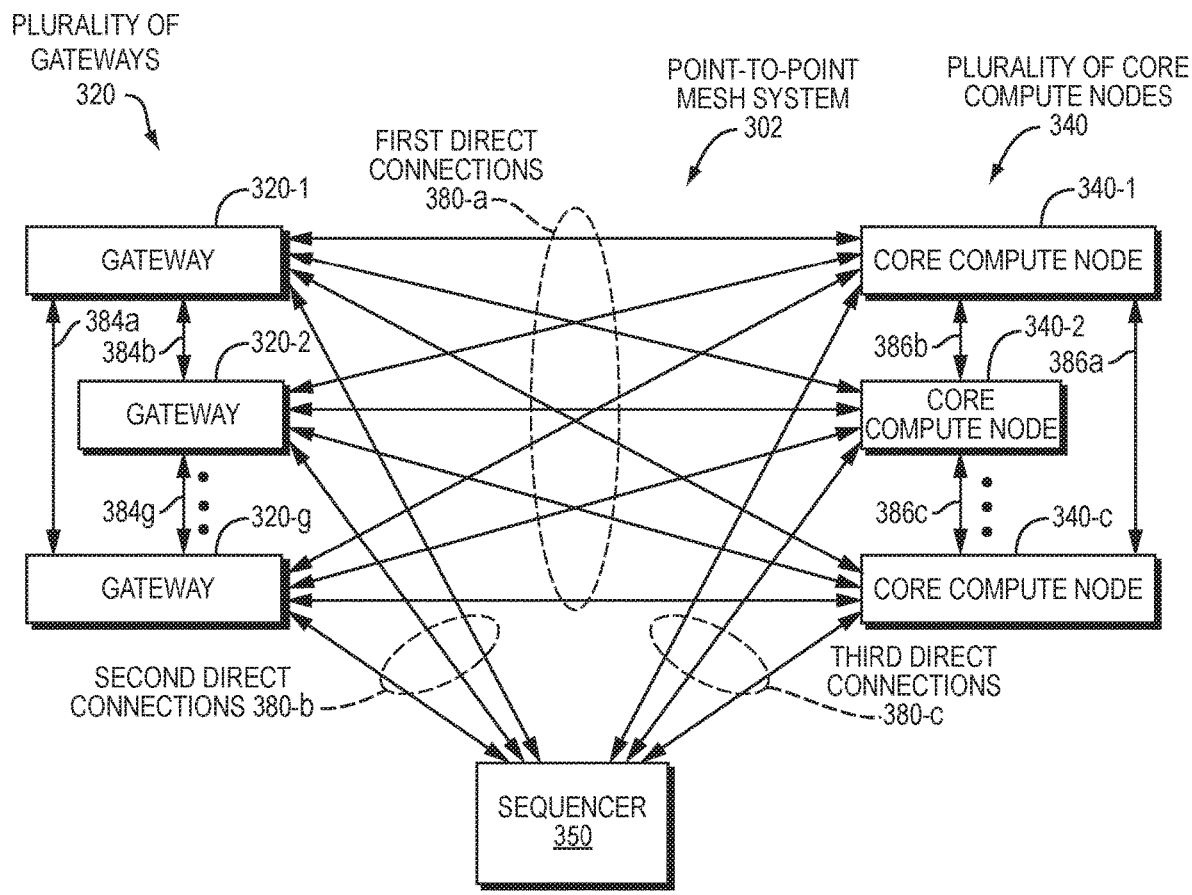
FIG. 3 is a block diagram of another example embodiment of a point-to-point mesh system.

FIG. 3 is a block diagram of another example embodiment of a point-to-point mesh system 302. The point-to-point mesh system 302 includes a plurality of gateways 320, plurality of core compute nodes 340, and the sequencer 350. Each gateway 320-1, 320-2 . . . 320-$g$ of the plurality of gateways 320 is coupled to each core compute node 340-1, 340-2 . . . 340-$c$ of the plurality of core compute nodes 340 via respective first direct connections, namely the first direct connections 380-$a$. The sequencer 350 is coupled to each gateway of the plurality of gateways 320 via respective second direct connections, namely the second direct connections 380-$b$, and coupled to each core compute node of the plurality of core compute nodes via respective third direct connections, namely the third direct connections 380-$c$. Referring to FIGS. 1B, 1D, and FIG. 3, the gateway 120-1 may be a given gateway of a plurality of gateways 320 communicatively coupled to each other via a shared gateway network, such as disclosed above with regard to FIG. 1D, or via the direct connections 384$a$, 384$b$ . . . 384$g$ of FIG. 3. The plurality of gateways 320 includes the gateways 320-1, 320-2, . . . 320-$g$ in the example embodiment. The core compute node 140-1 may be a given core compute node of a plurality of core compute nodes 340 including the core compute nodes 340-1, 340-2, . . . 340-$c$ that may be communicatively coupled to each other via a shared core compute node network, such as disclosed above with regard to FIG. 1D, or via the direct connections 386$a$, 386$b$ . . . 386$c$ of FIG. 3. It should be understood that a number g of gateways may be the same or different from another number c of core compute nodes in the point-to-point mesh system 302. According to an example embodiment, the sequencer 150-1 may be a given sequencer of a plurality of sequencers communicatively coupled to each other via a shared sequencer network, such as the sequencer-wide shared network 182-*s* disclosed above with regard to FIG. 1D, or via direct connections, such as the fourth direct connection 482, disclosed below with regard to FIG. 4.

Figure 4:
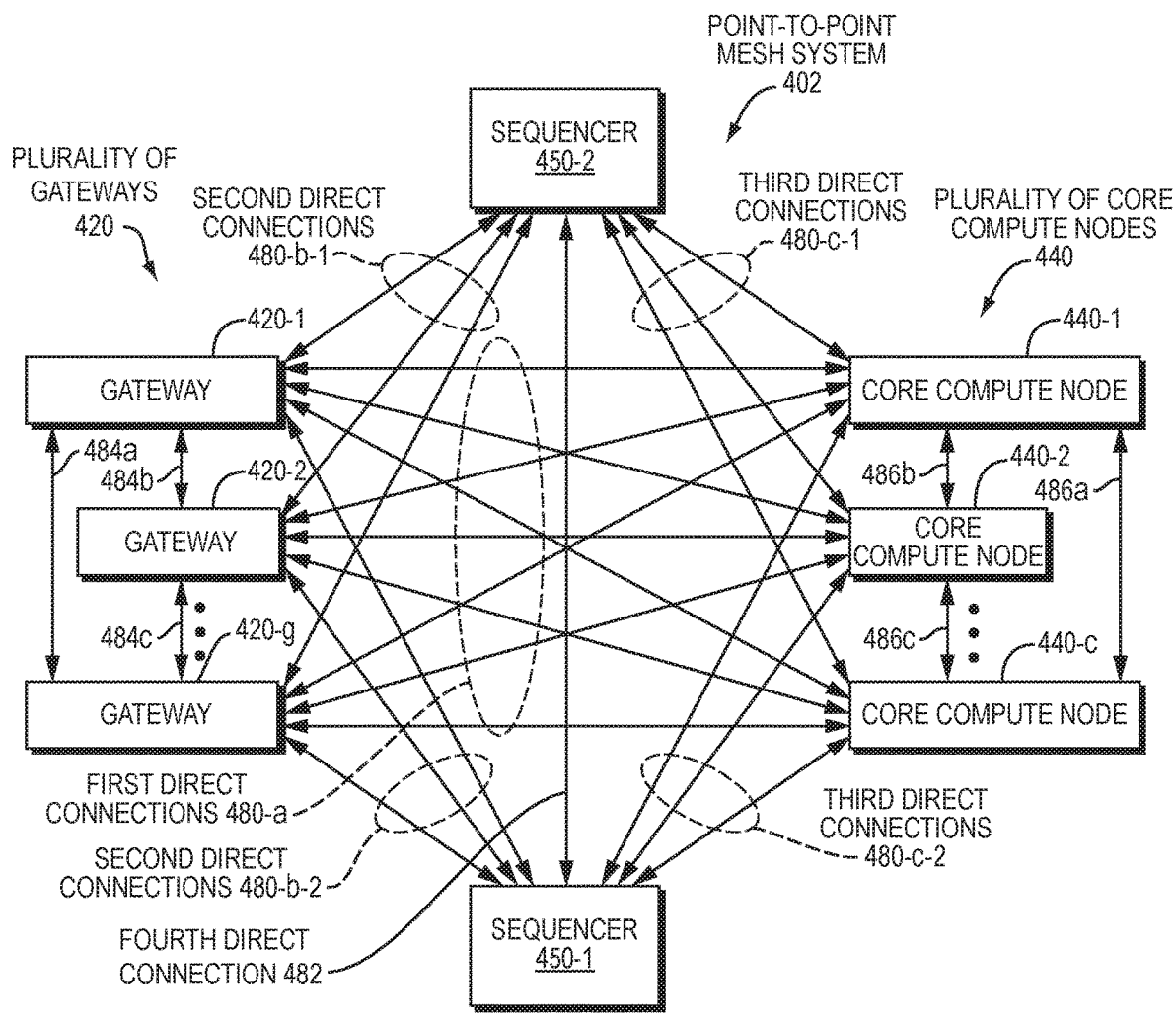
FIG. 4 is a block diagram of another example embodiment of a point-to-point mesh system.

FIG. 4 is a block diagram of another example embodiment of a point-to-point mesh system 402. With reference to FIG. 1B and FIG. 4, the sequencer 150-1 may be a given sequencer of a plurality of sequencers including the sequencer 450-1 and at least one other sequencer 450-2 in the point-to-point mesh system 402.

In the point-to-point mesh system 402, each gateway 420-1, 420-2 . . . 420-*g* of the plurality of gateways 420 is coupled to each core compute node 440-1, 440-2 . . . 440-*c* of the plurality of core compute nodes via respective first direct connections, namely the first direct connections 480*a*. Each gateway of the plurality of gateways 420 is coupled to each sequencer 450-1 . . . 450-2 of the plurality of sequencers via respective second direct connections, namely the second direct connections 480-*b*-1 and 480-*b*-2. Each core compute node 440-1, 440-2 . . . 440-*c* of the plurality of core compute nodes 440 is coupled to each sequencer 450-1 . . . 450-2 of the plurality of sequencers via respective third direct connections, namely the third direct connections 480-*c*-1 and 480-*c*-2.

The given sequencer, that is, a particular sequencer of the sequencers 450-1 . . . 450-2, may be configured to be in an active state and each other sequencer of the plurality of sequencers may be configured to be in a standby state. Each sequencer of the plurality of sequencers may be coupled to each other sequencer of the plurality of sequencers via respective fourth direct connections, such as the fourth direct connection 482. Each gateway 420-1, 420-2 . . . 420-*g* of the plurality of gateways 420 may be further configured to transmit a respective compute-node-destined message (not shown) transmitted therefrom to the given sequencer of the plurality of sequencers 450-1 . . . 450-2 that is in the active state. Each core compute node 440-1, 440-2 . . . 440-*c* of the plurality of core compute nodes 440 is further configured to transmit a respective gateway-destined message (not shown) transmitted therefrom to the given sequencer of the plurality of sequencers 450-1 . . . 450-2 that is in the active state. The at least one other sequencer is in a standby state.

The given sequencer that is in the active state may be further configured to transmit the sequence-marked message, such as the sequence-marked message 106' and sequence-marked response 107' via each respective fourth direct connection 482 to each other sequencer of the plurality of sequencers 450-1 . . . 450-2. It should be understood, however, that the active sequencer, that is, the given sequencer in the active state, does not need to forward the sequenced-marked message to the standby sequencers, that is, the sequencers in the standby state, and could, alternatively, continually broadcast/replicate a journal, also referred to herein as a state log (which would include the sequence information therein) to the standby sequencers, such as disclosed above with regard to FIG. 1D.

The electronic trading system 100 may further comprise a system state log (not shown), such as disclosed above with regard to FIG. 1D. The active sequencer may be configured to transmit the system state log via the shared sequencer network from the active sequencer to at least one other sequencer of the plurality of sequencers. For example, the shared sequencer network may include the fourth direct connection 482 and the system state log may be transmitted from the sequencer 450-1 to the sequencer 450-2 in an event the sequencer 450-1 is the given sequencer that is in the active state.

Figure 5:
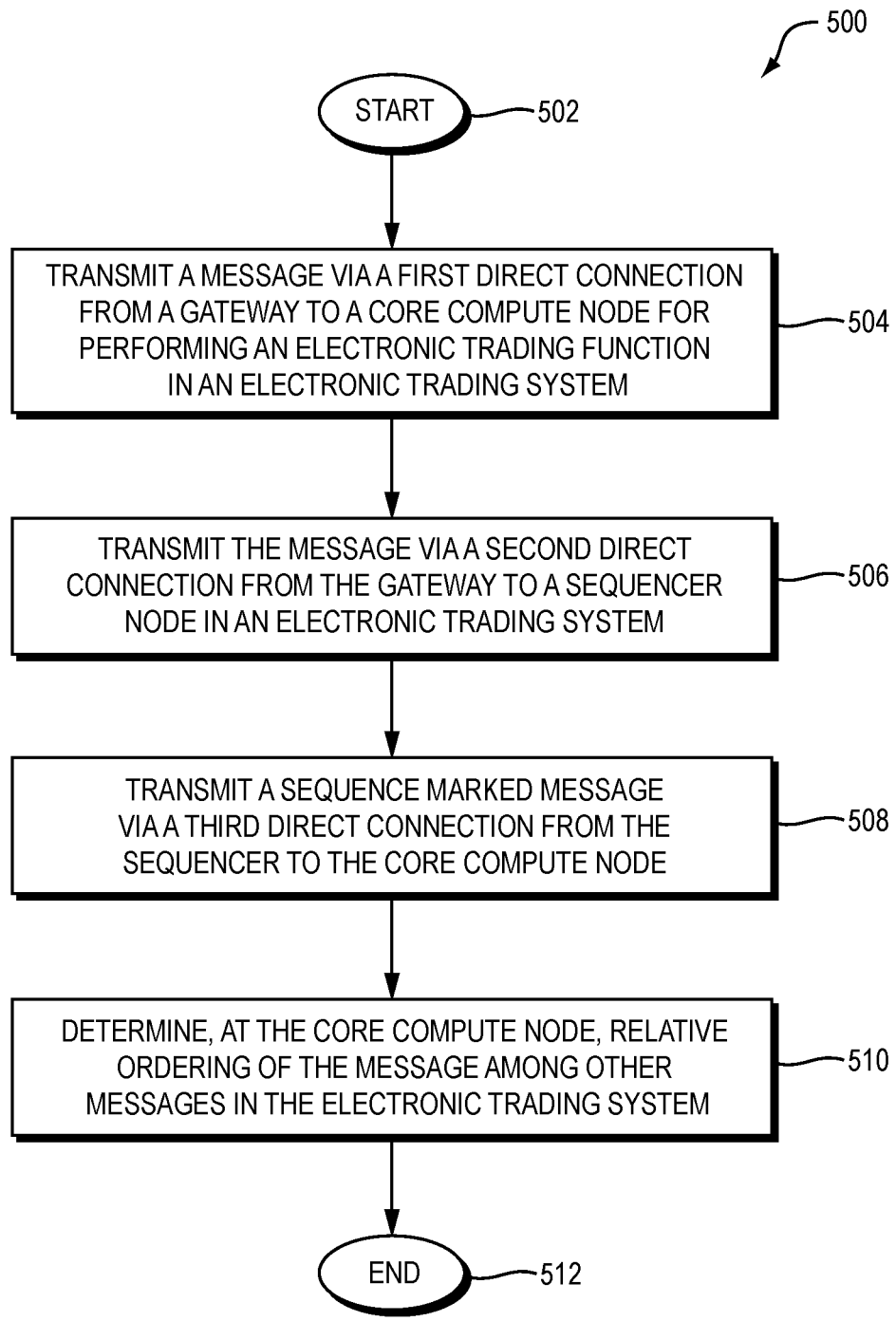
FIG. 5 is a flow diagram of an example embodiment of a method for performing electronic trading.

FIG. 5 is a flow diagram 500 of an example embodiment of a method for performing electronic trading. The method begins (502) and transmits a message via a first direct connection from a gateway to a core compute node for performing an electronic trading function in an electronic trading system (504). The method transmits the message via a second direct connection from the gateway to a sequencer in the electronic trading system (506). The method transmits a sequence-marked message via a third direct connection from the sequencer to the core compute node (508). The method determines, at the core compute node, relative ordering of the message among other messages in the electronic trading system based on the sequence-marked message to complete the electronic trading matching function (510). The method thereafter ends (512), in the example embodiment.

The method may further comprise producing the sequence-marked message by marking the message, or representation thereof, with a unique sequence identifier. The message may be a gateway message. Transmitting the gateway message may include transmitting the gateway message in response to receipt of an incoming message from a participant device. The sequence-marked message may be a first sequence-marked message. The method may further comprise transmitting a core compute node message via the first direct connection from the core compute node to the gateway in response to receipt of the message. The method may further comprise transmitting the core compute node message via the third direct connection to the sequencer and, in turn, transmitting a second sequence-marked message via the second direct connection to the gateway. The method may further comprise determining, at the gateway, relative ordering of the core compute node message among other messages in the electronic trading system based on the second sequence-marked message. The method may further comprise transmitting an outgoing message to the participant device based on the determining.

The method may further comprise transmitting the sequence-marked message via the second direct connection from the sequencer to the gateway. The method may further comprise transmitting the second sequence-marked message via the third direct connection from the sequencer to the core compute node.

The gateway may be a given gateway of a plurality of gateways, the core compute node may be a given core compute node of a plurality of core compute nodes, and the method may further comprise transmitting a respective compute-node-destined message transmitted from each gateway of the plurality of gateways to all core compute nodes of the plurality of core compute nodes and to the sequencer. The method may further comprise transmitting a respective gateway-destined message transmitted from each core compute node of the plurality of core compute nodes to all gateways of the plurality of gateways and to the sequencer. The method may further comprise transmitting a respective sequence-marked message to the plurality of gateways and plurality of core compute nodes from the sequencer in response to the respective compute-node-destined message and the respective gateway-destined received at the sequencer.

The sequencer may be a given sequencer of a plurality of sequencers that is in an active state. The method may further comprise transmitting a respective compute-node-destined message transmitted from each gateway of the plurality of gateways to the given sequencer of the plurality of sequencers that is in the active state. The method may further comprise transmitting a respective gateway-destined message transmitted from each core compute node of the plurality of core compute nodes to the given sequencer of the plurality of sequencers that is in the active state. The method may further comprise transmitting the sequence-marked message from the given sequencer to each other sequencer of the plurality of sequencers.

A plurality of functionally equivalent messages may be received from among the plurality of core compute nodes, plurality of sequencers, or combination thereof, at the given gateway and the method may further comprise performing an action at the given gateway based on a given functionally equivalent message of the plurality of functionally equivalent messages. The given functionally equivalent message may be first, among the plurality of functionally equivalent message, to arrive at the given gateway. The method may further comprise ignoring other functionally equivalent messages of the plurality of functionally equivalent messages that arrive after the given functionally equivalent message at the given gateway.

According to an example embodiment, a plurality of functionally equivalent messages may be received from among the plurality of core compute nodes, plurality of sequencers, or combination thereof, at the given gateway. The method may further comprise performing an action at the given gateway based on a given functionally equivalent message of the plurality of functionally equivalent messages. The given functionally equivalent message may be first to arrive at the given gateway. The method may further comprise ignoring other functionally equivalent messages of the plurality of functionally equivalent messages that arrive after the given functionally equivalent message at the given gateway.

The method may further comprise matching trade orders related to a financial instrument at the core compute node based on the electronic trading matching function performed and maintaining a residual position of the financial instrument on an order book. The residual position may include an unmatched amount of the financial instrument resulting from the electronic trading matching function performed.

The method may further comprise synchronizing the gateway, core compute node, and sequencer, based on a clock. The method may further comprise serving at least one participant device at the gateway and transmitting the message to the sequencer and core compute nodes from the gateway in response to receipt of an incoming message at the gateway. The incoming message may be sourced by the at least one participant device.

The method may further comprise protecting the first direct connection, second direct connection, and third direct connection, or a subset thereof, via at least one respective redundant direct connection.

The gateway may be a given gateway of a plurality of gateways. The core compute node may be a given core compute node of a plurality of core compute nodes. The method may further comprise enabling the plurality of gateways to communicate via a shared gateway network and enabling the plurality of core compute nodes to communicate via a shared core compute node network. The sequencer may be a given sequencer of a plurality of sequencers and the method may further comprise enabling the plurality of sequencers to communicate via a shared sequencer network.

The given sequencer may be an active sequencer, the active sequencer being a single sequencer among the plurality of sequencers that is in an active state. The method may further comprise transmitting a system log via the shared sequencer network from the active sequencer to at least one other sequencer of the plurality of sequencers. The at least one other sequencer is in a standby state.

The electronic trading system may be an active electronic trading system and the method may further comprise enabling at least one sequencer of the plurality of sequencers to communicate with a disaster recovery site. The disaster recovery site includes a standby electronic trading system.

Figure 6:
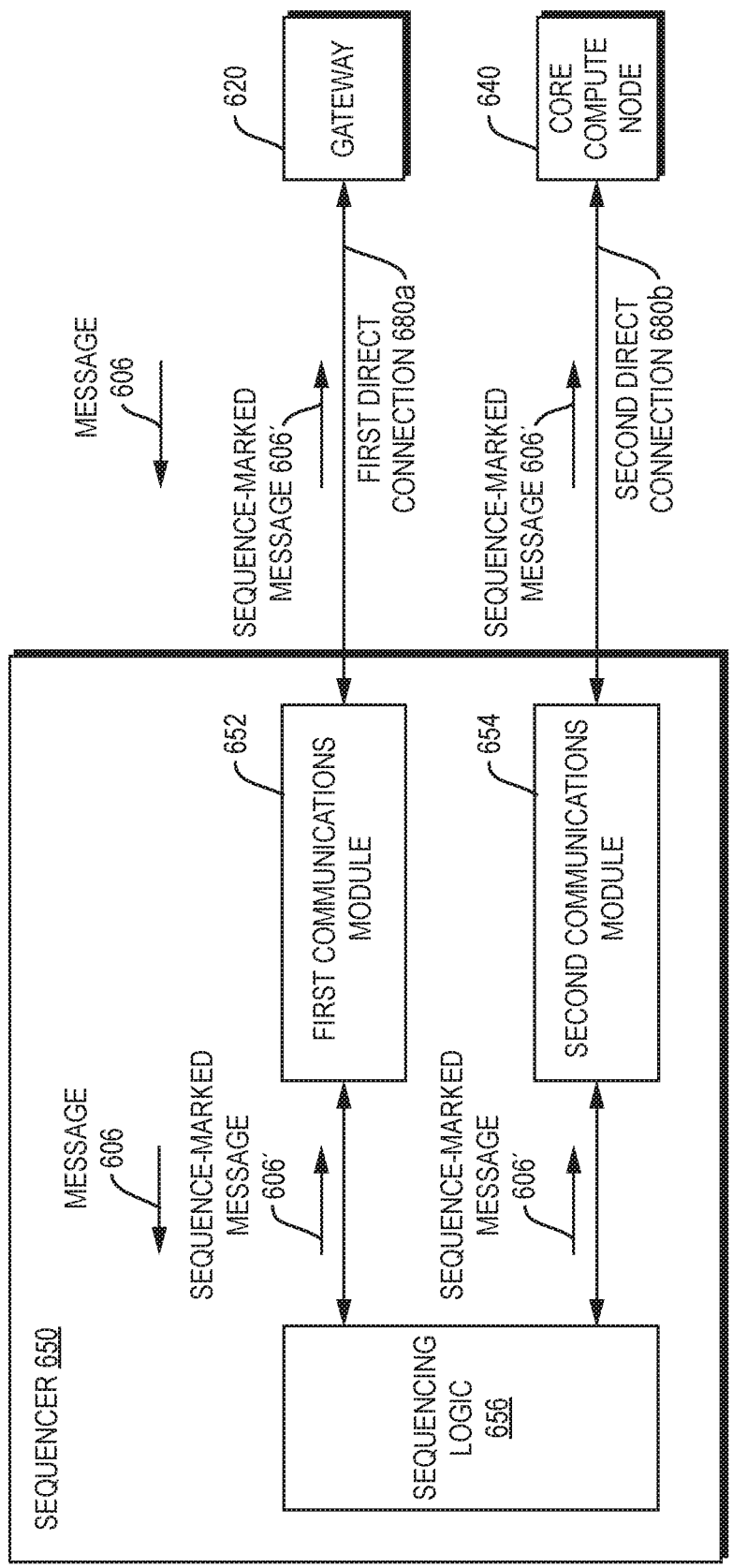
FIG. 6 is a block diagram of an example embodiment of a sequencer of an electronic trading system.

FIG. 6 is a block diagram of an example embodiment of a sequencer 650 of an electronic trading system, such as the electronic trading system 100 disclosed above. In the example embodiment, the sequencer 650 comprises a first communications module 652 configured to communicate directly with a gateway 620 via a first direct connection 680a in a point-to-point mesh system, such as the point-to-point mesh system 102 of the electronic trading system 100, disclosed above. The sequencer 650 further comprises a second communications module 654 configured to communicate directly with a core compute node 640 via a second direct connection 680b in the point-to-point mesh system in the electronic trading system. The sequencer 650 further comprises sequencing logic 656 coupled to the first communications module 652 and second communications module 654.

The sequencing logic 656 is configured to produce a sequence-marked message 606' by marking a message 606, or representation thereof, with a unique sequence identifier (not shown), the message 606 received by the first communications module 652 or second communications module 654 via the first direct connection 680a or second direct connection 680b, respectively. The sequencing logic 656 is further configured to transmit the sequence-marked message 606' to the gateway 620 and core compute node 640 via the first communications module 652 and second communications module 654, respectively.

According to an example embodiment, the sequencing logic is a portion of logic of an FPGA, for example, in the Fixed Logic Device 230 of FIG. 2, disclosed above.), or an ASIC. Further, both communications modules 652 and 654 may be implemented in the FPGA, for example, in the 10 GigE MAC Cores 260 disclosed above with regard to FIG. 2.

Figure 7:
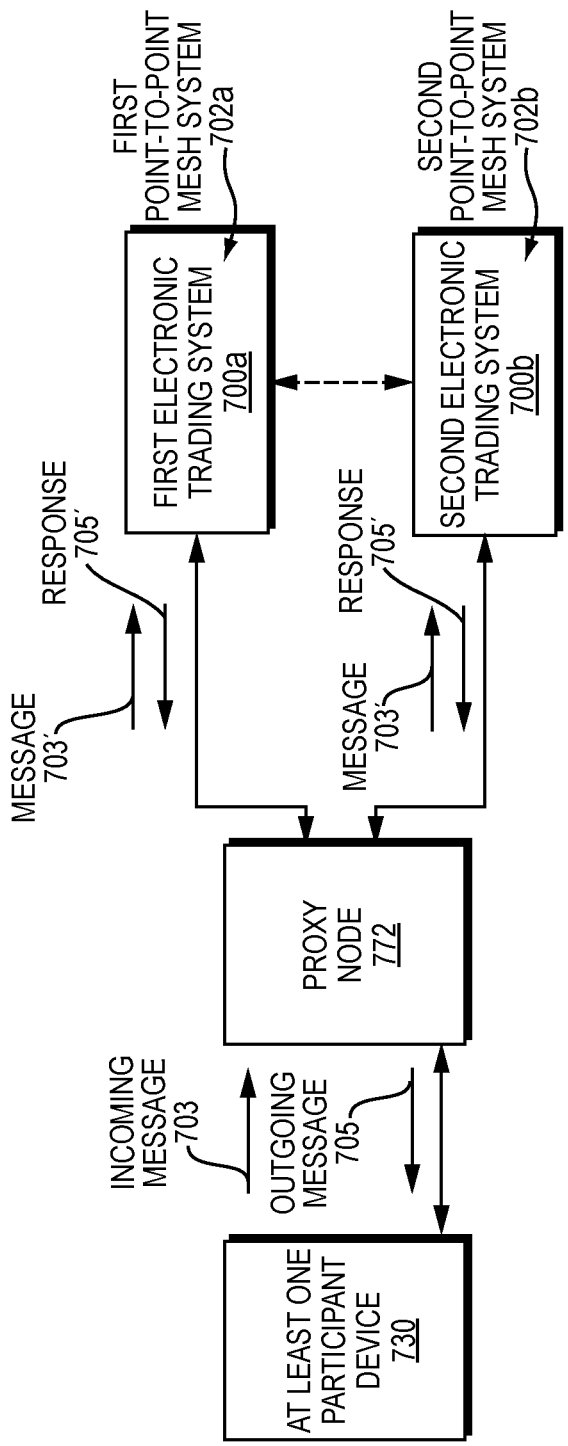
FIG. 7 is a block diagram of another example embodiment of an electronic trading system.

FIG. 7 is a block diagram of another example embodiment of an electronic trading system, such as the electronic trading system 100 of FIG. 1B, disclosed above. Referring to FIG. 1B and FIG. 7, the gateway 120-1, core compute node 140-1, sequencer 150-1, first direct connection 180-1-1, second direct connection 180-gw1-s1, and third direct connection 180-c1-s1 form a first point-to-point mesh system 702a. The electronic trading system 100 may be a first electronic trading system 700a that is communicatively coupled to a proxy node 772. The proxy node 722 may be further communicatively coupled to at least one participant device 730 and a second electronic trading system 700b. The second electronic trading system 700b may include a second point-to-point mesh system 702b, such as the point-to-point mesh system 102, disclosed above with regard to FIG. 1B.

The proxy node 772 is configured to transmit a message 703' to the first electronic trading system 700a and second electronic trading system 700b in response to receipt of an incoming message 703 from the at least one participant device 730 and may be further configured to send a response, that is, the outgoing message 705, to the at least one participant device 730 in response to receipt of a first arriving response 705' received from the first electronic trading system 700a or second electronic trading system 700b. The first electronic trading system 700a and second electronic trading system 700b may be synchronized 777, for example, based on a common clock that provides, for example, time-of-day. It should be understood, however, that the first electronic trading system 700a and second electronic trading system 700b are not limited to being synchronized 777 based on a common clock.

According to an example embodiment, a single active/primary sequencer (not shown) for the entire system encompassing both the electronic trading system 700a and electronic trading system 700b may be employed for coordinating sequence numbers between the electronic trading system 700a and electronic trading system 700b. For example, the single active/primary sequencer may coordinate such sequence numbers such that the arriving response 705' is assigned the same sequence number by both the electronic trading system 700a and electronic trading system 700b, such that the proxy node 772 can properly determine relative ordering of messages. For example, if the single active/primary sequencer active sequencer is in the electronic trading system 700a, that active sequencer may be configured to communicate to the electronic trading system 700b, for example, by communicating to a standby sequencer in the electronic trading system 700b, the sequence number being assigned on a message-by-message basis.

The architectures described above, such as the point-to-point mesh architecture, may be of use in applications other than electronic trading systems. For example, it is possible that it may be used to monitor data streams flowing across a network, to capture packets, decode the packets' raw data, analyze packet content in real time, and provide responses, for applications other than handling securities trade orders.

Further example embodiments disclosed herein may be configured using a computer program product; for example, controls may be programmed in software for implementing example embodiments. Further example embodiments may include a non-transitory computer-readable medium containing instructions that may be executed by a processor, and, when loaded and executed, cause the processor to complete methods described herein. It should be understood that elements of the block and flow diagrams may be implemented in software or hardware, such as via one or more arrangements of circuitry of FIG. 2, disclosed above, or equivalents thereof, firmware, custom designed semiconductor logic, Application Specific Integrated Circuits (ASICs), Field Programmable Gate Arrays (FPGAs), a combination thereof, or other similar implementation determined in the future.

In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as one or more random access memor(ies) (RAMs), read only memor(ies) (ROMs), compact disk read-only memor(ies) (CD-ROMs), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

Accordingly, further embodiments may also be implemented in a variety of computer architectures, physical, virtual, cloud computers, and/or some combination thereof, and, thus, the data processing systems described herein are intended for purposes of illustration only and not as a limitation of the embodiments.

While example embodiments have been particularly shown and described, it will be understood by those skilled in the art that various changes in form and details may be made therein without departing from the scope of the embodiments encompassed by the appended claims.

What is claimed is:

1. An electronic trading system, comprising:
a gateway;
a core compute node configured to perform an electronic trading matching function; and
a sequencer,
the gateway and core compute node coupled via a first direct connection, the gateway and sequencer coupled via a second direct connection, the sequencer and core compute node coupled via a third direct connection, the first, second, and third direct connections having respective non-shared bandwidths,
the gateway configured to transmit a message, representing an electronic trade request with an offer to buy or sell a financial instrument, to the core compute node via the first direct connection, the message received, in turn, by the core compute node, the gateway further configured to transmit the message via the second direct connection to the sequencer which is configured to, in turn, transmit a sequence-marked message to the core compute node via the third direct connection, the sequencer interposed between the gateway and core compute node via the second and third direct connections, the sequence-marked message transmitted by the sequencer being a sequenced version of the message transmitted by the gateway, the sequence-marked message received, in turn, by the core compute node, the core compute node configured to determine relative ordering of the sequence-marked message among sequence-marked versions of other messages received by the core compute node in the electronic trading system, the core compute node further configured to complete the electronic trading matching function for the electronic trade request in accordance with the relative ordering determined, causing the offer to be matched with a counteroffer for the financial instrument enabling an electronic trade of the financial instrument.

2. The electronic trading system of claim 1, wherein the message and the sequence-marked message include identical user data, the user data associated with the electronic trade request.

3. The electronic trading system of claim 1, wherein the message is a gateway message transmitted by the gateway in response to receipt of an incoming message received by the gateway from a participant device, wherein the sequencer is further configured to, in turn, transmit the sequence-marked message via the second direct connection to the gateway, the sequence-marked message received, in turn, by the gateway, wherein the sequence-marked message is a first sequence-marked message, and wherein the core compute node is further configured to:

transmit a core compute node message via the first direct connection to the gateway in response to receiving the gateway message; and transmit the core compute node message via the third direct connection to the sequencer which is further configured to, in turn, transmit a second sequence-marked message via the second direct connection to the gateway, the second sequence-marked message being a sequenced version of the core compute node message, the gateway further configured to:

determine relative ordering of the second sequence-marked message and the sequenced sequence-marked versions of other messages sent from the core compute node to the gateway; and transmit an outgoing message to the participant device, the outgoing message transmitted based on in accordance with the relative ordering determined.

4. The electronic trading system of claim 1, wherein the gateway is a given gateway among a plurality of gateways, wherein the core compute node is a given core compute node among a plurality of core compute nodes, and wherein:

each gateway of the plurality of gateways is coupled to each core compute node of the plurality of core compute nodes via respective first direct connections;

the sequencer is coupled to each gateway of the plurality of gateways via respective second direct connections and coupled to each core compute node of the plurality of core compute nodes via respective third direct connections, the plurality of gateways, plurality of core compute nodes, sequencer, and respective direct connections forming at least a portion of a point-to-point mesh system within which:

each gateway of the plurality of gateways is configured to transmit a respective compute-node-destined message transmitted therefrom to all compute nodes of the plurality of core compute nodes and to the sequencer;

each core compute node of the plurality of core compute nodes is configured to transmit a respective gateway-destined message transmitted therefrom to all gateways of the plurality of gateways and to the sequencer; and the sequencer is further configured to transmit, to the plurality of gateways and plurality of core compute nodes, a respective sequence-marked message in response to receipt of the respective compute-node-destined message or the respective gateway-destined message.

5. The electronic trading system of claim 4, wherein:

the sequencer is a given sequencer of a plurality of sequencers in the point-to-point mesh system;

each gateway of the plurality of gateways is coupled to each sequencer of the plurality of sequencers via respective second direct connections;

each core compute node of the plurality of core compute nodes is coupled to each sequencer of the plurality of sequencers via respective third direct connections;

the given sequencer is a currently active sequencer servicing the point-to-point mesh system and each other sequencer of the plurality of sequencers are standby sequencers waiting to take over as the currently active sequencer;

each sequencer of the plurality of sequencers is coupled to each other sequencer of the plurality of sequencers via a respective fourth direct connection;

each gateway of the plurality of gateways is further configured to transmit a respective compute-node-destined message to the given sequencer of the plurality of sequencers;

each core compute node of the plurality of core compute nodes are further configured to transmit a respective gateway-destined message to the given sequencer of the plurality of sequencers; and the given sequencer is further configured to transmit the sequence-marked message via each respective fourth direct connection to each other sequencer of the plurality of sequencers to enable the standby sequencers to be able to take over as the currently active sequencer in an event the currently active sequencer fails.

6. The electronic trading system of claim 4, wherein the respective compute-node-destined message transmitted by the given gateway is a same message received by the plurality of core compute nodes, wherein the plurality of core compute nodes are configured to generate response messages in response to receipt of the same message, the response messages received at the given gateway from among the plurality of core compute nodes, and wherein the given gateway is further configured to:

take action based on a given response message of the response messages generated in response to receipt of the same message, the given response message being first to arrive at the given gateway relative to other response messages generated in response to receipt of the same message; and ignore the other response messages that arrive after the given response message.

7. The electronic trading system of claim 4, wherein a plurality of compute-node-destined messages representing a same message are received from among the plurality of gateways, at the given compute node, and wherein the given compute node is further configured to:

take action based on a given compute-node-destined message of the plurality of compute-node-destined messages, the given compute-node-destined message being first to arrive at the given compute node relative to other compute-node-destined messages of the plurality of compute-node-destined messages representing the same message; and ignore the other compute-node-destined messages that arrive after the given compute-node-destined message.

8. The electronic trading system of claim 1, further comprising an order book accessible by the core compute node and wherein the core compute node is further configured to:

match trade orders related to the financial instrument using the electronic trading matching function; and maintain a residual position of the financial instrument on the order book, wherein an unmatched amount of the financial instrument results from performing the electronic trading matching function, and wherein the residual position includes the unmatched amount of the financial instrument.

9. The electronic trading system of claim 1, further comprising a clock and wherein the gateway, core compute node, and sequencer, are synchronized based on the clock.

10. The electronic trading system of claim 1, wherein the gateway is further configured to:

serve at least one participant device; and transmit the message to the sequencer and core compute node in response to receipt of an incoming message at the gateway, the incoming message sourced by the at least one participant device, and wherein the sequencer is further configured to produce the sequence-marked message by marking the message with a unique sequence identifier or by creating a representation of the message received, marking the representation with the unique sequence identifier, and transmitting the representation marked, the representation marked being the sequence-marked message.

11. The electronic trading system of claim 1, further comprising at least one respective redundant direct connection for the first direct connection, second direct connection, and third direct connection, or a subset thereof.

12. The electronic trading system of claim 1, wherein:
the gateway is a given gateway of a plurality of gateways communicatively coupled to each other via a shared gateway network;
the core compute node is a given core compute node of a plurality of core compute nodes communicatively coupled to each other via a shared core compute node network; and
the sequencer is a given sequencer of a plurality of sequencers communicatively coupled to each other via a shared sequencer network or via respective fourth direct connections.

13. The electronic trading system of claim 12, further comprising a system state log, wherein the given sequencer is configured to transmit the system state log via the shared sequencer network to at least one other sequencer of the plurality of sequencers.

14. The electronic trading system of claim 12, wherein the electronic trading system is an active electronic trading system and wherein at least one sequencer of the plurality of sequencers is communicatively coupled to a disaster recovery site, the disaster recovery site including a standby electronic trading system, the standby electronic trading system being a replica of the active electronic trading system and configured to allow electronic trading to continue in an event the active electronic trading system fails.

15. The electronic trading system of claim 1, wherein:
the gateway, core compute node, sequencer, and first, second, and third direct connections form a first point-to-point mesh system;
the electronic trading system is a first electronic trading system communicatively coupled to a proxy node, the proxy node further communicatively coupled to at least one participant device and a second electronic trading system, the second electronic trading system including a second point-to-point mesh system; and
the proxy node is configured to transmit a message to the first and second electronic trading systems in response to receipt of an incoming message from the at least one participant device, the first and second electronic trading systems configured to generate respective responses to the message transmitted by the proxy node, the proxy node further configured to send a response to the at least one participant device in response to receipt of a first arriving response of the respective responses generated and received from the first or second electronic trading systems.

16. A method for performing electronic trading, the method comprising:
transmitting a message, representing an electronic trade request with an offer to buy or sell a financial instrument, via a first direct connection from a gateway to a core compute node;
receiving the message, in turn, at the core compute node for performing an electronic trading function in an electronic trading system;
transmitting the message via a second direct connection from the gateway to a sequencer in the electronic trading system and, in turn, transmitting a sequence-marked message via a third direct connection from the sequencer to the core compute node, the first, second, and third direct connections having respective non-shared bandwidths, the sequencer interposed between the gateway and core compute node via the second and third direct connections, the sequence-marked message transmitted by the sequencer being a sequenced version of the message transmitted from the gateway via the second direct connection;
receiving the sequence-marked message, in turn, at the core compute node;
receiving, at the core compute node, other messages from the gateway and receiving, at the core compute node, sequence-marked versions of the other messages from the sequencer;
determining, at the core compute node, relative ordering of the sequence-marked message among the sequence-marked versions of the other messages received by the core compute node in the electronic trading system; and
completing, at the core compute node, the electronic trading matching function for the electronic trade request in accordance with the relative ordering determined, the completing causing the offer to be matched with a counteroffer for the financial instrument enabling an electronic trade of the financial instrument.

17. The method of claim 16, wherein the message and the sequence-marked message include identical user data, the user data associated with an electronic trade request.

18. The method of claim 16, wherein the message is a gateway message, wherein the method further comprises receiving an incoming message from a participant device at the gateway, wherein transmitting the gateway message includes transmitting the gateway message by the gateway in response to receipt of the incoming message by the gateway from the participant device, wherein the sequence-marked message is a first sequence-marked message, and wherein the method further comprises:
transmitting the first sequence-marked message via the second direct connection from the sequencer to the gateway, the first sequence-marked message received, in turn, by the gateway;
transmitting a core compute node message via the first direct connection from the core compute node to the gateway in response to receipt of the message;
transmitting the core compute node message via the third direct connection to the sequencer and, in turn, transmitting a second sequence-marked message via the second direct connection from the sequencer to the gateway, the second sequence-marked message being a sequenced version of the core compute node message;
determining, at the gateway, relative ordering of the second sequence-marked message and sequence-marked versions of other messages sent from the core compute node to the gateway; and
transmitting an outgoing message to the participant device, the outgoing message transmitted in accordance with the relative ordering determined.

19. The method of claim 16, wherein the gateway is a given gateway of a plurality of gateways, wherein the core compute node is a given core compute node of a plurality of core compute nodes, and wherein the method further comprises:
transmitting a respective compute-node-destined message transmitted from each gateway of the plurality of gateways to all core compute nodes of the plurality of core compute nodes and to the sequencer;

transmitting a respective gateway-destined message transmitted from each core compute node of the plurality of core compute nodes to all gateways of the plurality of gateways and to the sequencer; and transmitting a respective sequence-marked message to the plurality of gateways and plurality of core compute nodes from the sequencer in response to the respective compute-node-destined message and the respective gateway-destined received at the sequencer.

20. The method of claim 19, wherein the sequencer is a given sequencer among a plurality of sequencers and wherein the method further comprises:

transmitting a respective compute-node-destined message transmitted from each gateway of the plurality of gateways to the given sequencer;

transmitting the respective gateway-destined message transmitted from each core compute node of the plurality of core compute nodes to the given sequencer; and transmitting the sequence-marked message from the given sequencer to each other sequencer of the plurality of sequencers.

21. The method of claim 19, further comprising:

receiving a same message at the plurality of core compute nodes, the same message being the respective compute-node-destined message transmitted by the given gateway;

generating response messages at the plurality of core compute nodes in response to receipt of the same message;

receiving the response messages, at the given gateway, from among the plurality of core compute nodes;

performing an action at the given gateway based on a given response message of the response messages generated in response to receipt of the same message, the given response message being first to arrive at the given gateway relative to other response messages of the response messages generated in response to receipt of the same message; and ignoring the other response messages that arrive at the given gateway after the given response message.

22. The method of claim 19, further comprising:

receiving a plurality of compute-node-destined messages, at the given compute node, from among the plurality of gateways, the plurality of compute-node-destined messages representing a same message;

performing an action at the given compute node based on a given compute-node-destined message of the plurality of compute-node-destined messages, the given compute-node-destined message being first to arrive at the given compute node relative to other compute-node-destined messages of the plurality of compute-node-destined messages representing the same message; and ignoring the other compute-node-destined messages that arrive at the given compute node after the given compute-node-destined message.

23. The method of claim 16, further comprising:

matching trade orders related to a financial instrument at the core compute node based on the electronic trading matching function performed; and maintaining a residual position of the financial instrument on an order book, the residual position being an unmatched amount of the financial instrument resulting from the electronic trading matching function performed.

24. The method of claim 16, further comprising synchronizing the gateway, core compute node, and sequencer, based on a clock.

25. The method of claim 16, wherein the message is a gateway message and wherein the method further comprises:

serving at least one participant device at the gateway;

receiving an incoming message at the gateway;

transmitting the gateway message to the sequencer and core compute node from the gateway in response to receipt of the incoming message at the gateway, the incoming message sourced by the at least one participant device; and producing the sequence-marked message by marking the gateway message, or representation thereof, with a unique sequence identifier.

26. The method of claim 16, further comprising protecting the first direct connection, second direct connection, and third direct connection, or a subset thereof, via at least one respective redundant direct connection.

27. The method of claim 16, wherein the gateway is a given gateway of a plurality of gateways, wherein the core compute node is a given core compute node of a plurality of core compute nodes, wherein the sequencer is a given sequencer of a plurality of sequencers, and wherein the method further comprises:

enabling the plurality of gateways to communicate via a shared gateway network;

enabling the plurality of core compute nodes to communicate via a shared core compute node network; and enabling the plurality of sequencers to communicate via a shared sequencer network or via respective fourth direct connections.

28. The method of claim 27, further comprising:

transmitting a system log via the shared sequencer network from the given sequencer to at least one other sequencer of the plurality of sequencers.

29. The method of claim 27, wherein the electronic trading system is an active electronic trading system and wherein the method further comprises:

enabling at least one sequencer of the plurality of sequencers to communicate with a disaster recovery site, the disaster recovery site including a standby electronic trading system, the standby electronic trading system being a replica of the active electronic trading system and configured to allow electronic trading to continue in an event the active electronic trading system fails.

30. The electronic trading system of claim 3, wherein the sequencer is further configured to, in turn, transmit the second sequence-marked message via the third direct connection to the core compute node.

31. The method of claim 18, further comprising transmitting the second sequence-marked message via the third direct connection from the sequencer to the core compute node.

* * * * *

UNITED STATES PATENT AND TRADEMARK OFFICE
CERTIFICATE OF CORRECTION

PATENT NO. : 11,315,183 B2
APPLICATION NO. : 16/988510
DATED : April 26, 2022
INVENTOR(S) : Amicangioli et al.

Page 1 of 1

It is certified that error appears in the above-identified patent and that said Letters Patent is hereby corrected as shown below:

In the Claims

In Column 27, Claim 3, Line 12, delete "the sequenced";

In Column 27, Claim 3, Line 16, delete "based on".

Signed and Sealed this
Twenty-first Day of June, 2022

Katherine Kelly Vidal
*Director of the United States Patent and Trademark Office*